US012115778B2

(12) United States Patent
Yasuda et al.

(10) Patent No.: US 12,115,778 B2
(45) **Date of Patent: *Oct. 15, 2024**

(54) PRINTING APPARATUS

(71) Applicant: CANON KABUSHIKI KAISHA, Tokyo (JP)

(72) Inventors: Midori Yasuda, Kawasaki (JP); Yuki Kamio, Kawasaki (JP); Masashi Kamada, Kawasaki (JP); Masato Eiyama, Yokohama (JP); Yuki Igarashi, Tokyo (JP); Masashi Negishi, Kawasaki (JP); Ryoya Shinjo, Kawasaki (JP); Ryo Kobayashi, Kawasaki (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,453

(22) Filed: Jul. 5, 2023

(65) Prior Publication Data

US 2023/0347666 A1 Nov. 2, 2023

Related U.S. Application Data

(60) Continuation of application No. 16/988,310, filed on Aug. 7, 2020, now Pat. No. 11,718,110, which is a (Continued)

(30) Foreign Application Priority Data

Mar. 10, 2017 (JP) ................................ 2017-046433

(51) Int. Cl.
*B41J 11/00* (2006.01)
*B41J 15/04* (2006.01)
(Continued)

(52) U.S. Cl.
CPC ........ *B41J 11/0095* (2013.01); *B41J 11/0045* (2013.01); *B41J 15/046* (2013.01);
(Continued)

(58) Field of Classification Search
None
See application file for complete search history.

(56) References Cited

U.S. PATENT DOCUMENTS 9,073,718 B2 7/2015 Chen
9,334,137 B2 5/2016 Igarashi et al.
(Continued)

FOREIGN PATENT DOCUMENTS

JP 05-92634 A 4/1993
JP 08-12148 A 1/1996
(Continued)

OTHER PUBLICATIONS

Office Action dated Feb. 4, 2020, in Japanese Patent Application No. 2017-046433.

*Primary Examiner* — William A. Rivera
(74) *Attorney, Agent, or Firm* — Venable LLP

(57) ABSTRACT

A roll sheet, in which a continuous sheet is wound in a roll form, is caused to rotate in a forward direction to supply the sheet to a printing unit. First and second sensors are arranged at positions facing an outer circumferential surface of the roll sheet and deviated in an axis line direction of the roll sheet. Outputs of the first and second sensors are changed in accordance with a distance to a sheet of the roll sheet. A rotation direction of the roll sheet is switched from a forward direction to a reverse direction on the basis of the outputs of the first and second sensors while the roll sheet is being rotated in the reverse direction.

18 Claims, 21 Drawing Sheets

Related U.S. Application Data division of application No. 15/912,592, filed on Mar. 6, 2018, now Pat. No. 10,766,279.

(51) Int. Cl.

| | |
|---|---|
| ***B41J 15/16*** | (2006.01) |
| ***B65H 16/10*** | (2006.01) |
| ***B65H 20/02*** | (2006.01) |
| ***B65H 23/04*** | (2006.01) |
| ***B65H 23/188*** | (2006.01) |

(52) U.S. Cl.

CPC ............ *B41J 15/16* (2013.01); *B65H 16/106* (2013.01); *B65H 20/02* (2013.01); *B65H 23/044* (2013.01); *B65H 23/1888* (2013.01); *B65H 2301/522* (2013.01); *B65H 2403/942* (2013.01); *B65H 2701/1311* (2013.01)

(56) References Cited

U.S. PATENT DOCUMENTS

| | | | | |
|---|---|---|---|---|
| 9,539,831 | B2 | 1/2017 | Tanami et al. | |
| 9,579,907 | B2 | 2/2017 | Shinjo et al. | |
| 9,592,683 | B2 | 3/2017 | Kobayashi et al. | |
| 10,377,603 | B2 | 8/2019 | Sumioka | |
| 10,421,299 | B2 | 9/2019 | Daikoku et al. | |
| 10,427,431 | B2 | 10/2019 | Masuda et al. | |
| 10,597,247 | B2 | 3/2020 | Elyama et al. | |
| 10,703,117 | B2 | 7/2020 | Eiyama et al. | |
| 10,752,458 | B2 | 8/2020 | Wind et al. | |
| 11,718,110 | B2 * | 8/2023 | Yasuda | B41J 15/16 242/420.6 |
| 2006/0157526 | A1 | 7/2006 | Shiraishi et al. | |
| 2009/0255971 | A1 | 10/2009 | Nakamaki et al. | |
| 2010/0090396 | A1 | 4/2010 | Shinjo et al. | |
| 2010/0238225 | A1 | 9/2010 | Igarashi et al. | |
| 2012/0026265 | A1 | 2/2012 | Kawashima | |
| 2013/0015285 | A1 | 1/2013 | Uruma et al. | |
| 2013/0161369 | A1 | 6/2013 | Chen | |
| 2013/0213577 | A1 | 8/2013 | Matsumoto et al. | |
| 2014/0354750 | A1 | 12/2014 | Garbacz et al. | |
| 2015/0328906 | A1 | 11/2015 | Sumloka et al. | |
| 2016/0136976 | A1 | 5/2016 | Shinjo et al. | |
| 2016/0136980 | A1 | 5/2016 | Kobayashi et al. | |
| 2016/0136981 | A1 | 5/2016 | Suzuki et al. | |
| 2016/0137448 | A1 | 5/2016 | Sumioka | |
| 2016/0207333 | A1 | 7/2016 | Igarashi et al. | |
| 2017/0100946 | A1 | 4/2017 | Kudo | |
| 2017/0120636 | A1 | 5/2017 | Kobayashi et al. | |
| 2018/0154661 | A1 | 6/2018 | Tokai et al. | |
| 2018/0257407 | A1 | 9/2018 | Daikoku et al. | |
| 2018/0257893 | A1 | 9/2018 | Suzuki et al. | |
| 2020/0215832 | A1 | 7/2020 | Eiyama et al. | |
| 2021/0284476 | A1 | 9/2021 | Harigae et al. | |

FOREIGN PATENT DOCUMENTS

| | | | |
|---|---|---|---|
| JP | 08-133534 | A | 5/1996 |
| JP | 2000-169013 | A | 6/2000 |
| JP | 2005-060017 | A | 3/2005 |
| JP | 2008-230764 | A | 10/2008 |
| JP | 2009-205331 | A | 9/2009 |
| JP | 2011-037557 | A | 2/2011 |
| JP | 2016-104554 | A | 6/2016 |
| JP | 2016-104665 | A | 6/2016 |

* cited by examiner

PRINTING APPARATUS

BACKGROUND OF THE INVENTION

Field of the Invention

The present invention relates to a printing apparatus that performs printing on a sheet pulled out of a roll sheet in which a continuous sheet is wound.

Description of the Related Art

A printing apparatus that automatically detects a sheet leading end of an installed roll sheet (hereinafter also referred to simply as a "roll") is disclosed in Japanese Patent Laid-Open No. 2011-37557. The sheet leading end is detected through an optical sensor while causing the roll to rotate in a winding direction opposite to a supply direction, and when the detection is completed, the roll is caused to rotate in the supply direction to supply the sheet, in which the sheet leading end is separated (hereinafter also referred to as "peeled"), to the inside of the apparatus.

In the apparatus described in Japanese Patent Laid-Open No. 2011-37557, the peeling of the leading end portion of the sheet from the roll is detected by a sensor installed at one position in a sheet width direction (an axial direction). The sheet peeling of the other part of the leading end portion of the sheet that does not face the sensor is not detected. For the large-sized sheet, the sheet width may exceed 1 m, and the state of the other part of the leading end portion is unable to be determined through detection at one position. For example, there are cases in which a user fixes the center portion of the sheet using a tape in order to prevent the roll from being loosely wound while it is being used. In such a case, only the two end portions in the sheet width direction are peeled off from the roll, and the center portion is not peeled off. If the roll is set in the apparatus in this state without change, a malfunction occurs during the automatic feeding operation of the sheet.

Further, there is a form in which the user removes the roll in use from the apparatus, and sets the roll in the apparatus later again. However, the user does not necessarily cut the sheet correctly at the end of last use. If the user cuts the sheet with scissors or hands, the sheet leading end is likely to be cut obliquely or curvedly. When such a roll is set in the apparatus again, the leading end portion of the sheet is not detected correctly, leading to the malfunction in the automatic feeding operation.

SUMMARY OF THE INVENTION

The present invention provides a printing apparatus which is capable of preventing the occurrence of jam in a case in which the leading end portion of the sheet is fed.

In the aspect of the present invention, there is provided a printing apparatus comprising:

- a holding unit configured to hold a roll sheet in which a continuous sheet is wound in a roll form;
- a printing unit configured to perform printing on the sheet supplied from the holding unit;
- a driving unit configured to rotate in a first direction to cause the roll sheet held by the holding unit to rotate in a forward direction and supply the sheet to the printing unit;
- a first sensor arranged at a first position and configured to face an outer circumferential surface of the roll sheet held by the holding unit, an output of the first sensor being changed in accordance with a distance to the sheet of the roll sheet;
- a second sensor arranged at a second position which is different from the first position in an axis line direction of the roll sheet and configured to face the outer circumferential surface of the roll sheet held by the holding unit, an output of the second sensor being changed in accordance with a distance to the sheet of the roll sheet; and
- a control unit configured to cause the roll sheet to rotate in a reverse direction as the driving unit rotates in a second direction opposite to the first direction, the control unit switching, during the rotation of the roll sheet in the reverse direction, a rotation direction of the driving unit from the second direction to the first direction on the basis of the output of the first sensor and the output of the second sensor.

According to the present invention, the leading end portion of the sheet is detected by a plurality of sensors installed in the width direction of the sheet, and when a detection result therefrom satisfies a predetermined condition, the leading end portion of the sheet is fed. Accordingly, the occurrence of jam when the sheet is fed can be prevented.

Further features of the present invention will become apparent from the following description of exemplary embodiments with reference to the attached drawings.

DESCRIPTION OF THE EMBODIMENTS

Figure 1:
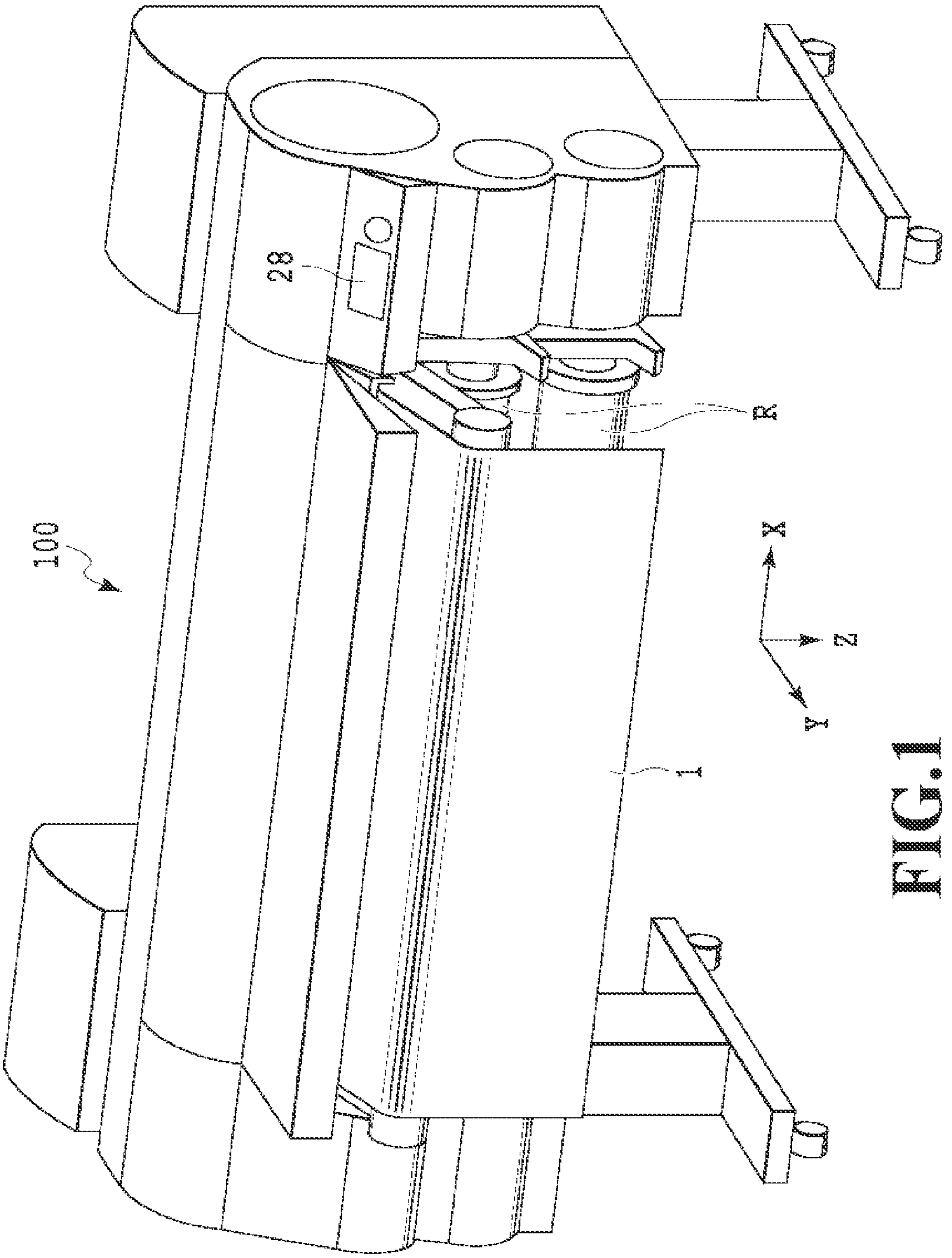
FIG. 1 is a perspective view of a printing apparatus according to the present invention.

Hereinafter, exemplary embodiments of the present invention will be described with reference to the appended drawings. First, a basic composition of the present invention will be described.

<Basic Configuration>

FIGS. 1 to 5 are explanatory diagrams of a basic configuration of a printing apparatus according to an embodiment of the present invention. A printing apparatus of the present example is an inkjet printing apparatus including a sheet supplying apparatus that supplies a sheet serving as a print medium and a printing unit that prints an image on the sheet. For the sake of description, coordinate axes are set as illustrated in the drawings. In other words, a sheet width direction of a roll R is set as an X-axis direction, a direction in which the sheet is conveyed in a printing unit 400 to be described later is set as a Y-axis direction, and a gravity direction is set as a Z-axis direction.

As illustrated in FIG. 1, two rolls R (the roll sheets) on which the sheet 1 which is a long continuous sheet (also referred to as a web) is wound in a roll form can be set in a printing apparatus 100 of the present example. An image is printed on the sheet 1 selectively pulled out of the rolls R. A user can input, for example, various commands to the printing apparatus 100 such as a command of designating a size of the sheet 1 or a command of performing switching between on-line and off-line using various switches installed in a manipulation panel 28.

Figure 2:
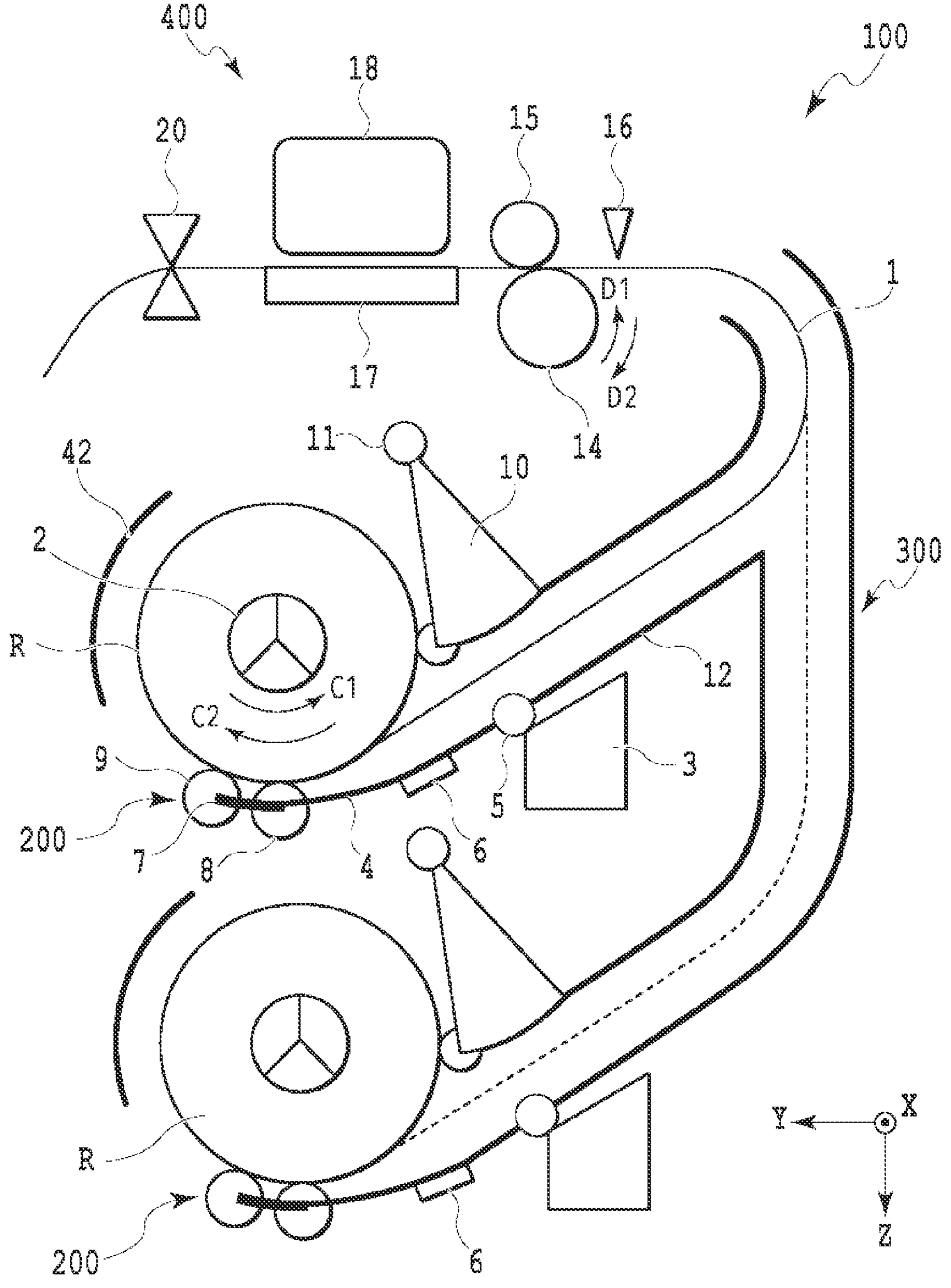
FIG. 2 is an explanatory diagram of a sheet conveyance path in the printing apparatus.

FIG. 2 is a schematic cross-sectional view of a main part of the printing apparatus 100. Two supplying apparatuses 200 corresponding to the two rolls R are installed one above the other. The sheet 1 pulled out of the roll R by the supplying apparatus 200 is conveyed, along a sheet conveyance path by a sheet conveying unit (conveying mechanism) 300, to the printing unit 400 capable of printing an image. The printing unit 400 prints an image on the sheet 1 by ejecting ink from an inkjet type print head 18. The print head 18 ejects ink from an ejection port using an ejection energy generating element such as an electrothermal transducer (heater) or a piezo element. The print head 18 is not limited to the inkjet system. Also, a printing system of the printing unit 400 is not limited, and, for example, a serial scan system or a full line system may be used. In the case of the serial scan system, an image is printed in association with a conveyance operation of the sheet 1 and scanning of print head 18 in a direction intersecting with a conveyance direction of the sheet 1. In the case of the full line system, an image is printed, while continuously conveying the sheet 1, using the long print head 18 extending in a direction intersecting with the conveyance direction of the sheet 1.

The roll R is set in the roll holding unit of the supplying apparatus 200 in a state in which a spool member 2 is inserted in a hollow hole portion of the roll R, and the spool member 2 is driven by a motor 33 for driving the roll R (sec FIG. 5) to rotate normally or reversely. The supplying apparatus 200 includes, as described later, a driving unit 3, an arm member (mobile body) 4, an arm rotational shaft 5, a sensor unit 6, a swing member 7, driving rotating bodies (contact bodies) 8 and 9, a separating flapper (upper side guide body) 10, and a flapper rotational shaft 11.

A conveyance guide 12 guides the sheet 1 to the printing unit 400 while guiding front and back surfaces of the sheet 1 pulled out from the supplying apparatus 200. A conveying roller 14 is rotated normally or reversely in directions of arrows D1 and D2 by a conveying roller driving motor 35 (see FIG. 5) to be described later. A nip roller 15 can be drivenly rotated in accordance with the rotation of the conveying roller 14 and can be brought into contact with or separated from the conveying roller 14 by a nip force adjusting motor 37 (see FIG. 5), and nip force thereof can be adjusted. A conveyance speed of the sheet 1 by the conveying roller 14 is set to be higher than a pulled-out speed of the sheet 1 by the rotation of the roll R, so that it is possible to apply back tension to the sheet 1 and convey the sheet 1 in a state in which the sheet 1 is stretched.

A platen 17 of the printing unit 400 regulates the position of the sheet 1, and a cutter 20 cuts the sheet 1 on which an image is printed. A cover 42 of the roll R prevents the sheet 1 on which an image is printed from entering the supplying apparatus 200. The operation in the printing apparatus 100 is controlled by a CPU 201 (see FIG. 5) to be described later. The platen 17 includes a sucking device using negative pressure or electrostatic force, and the sheet can be stably supported since the sheet is sucked onto the platen 17.

Figure 3A:
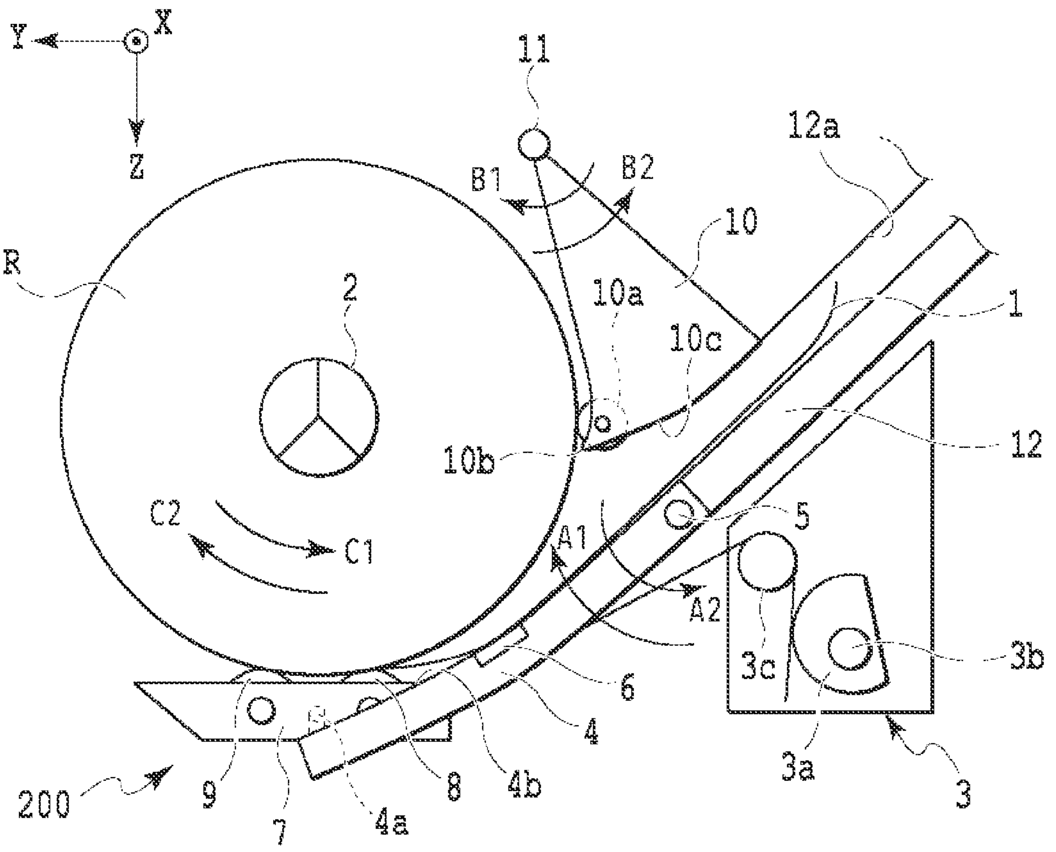
FIG. 3A is an explanatory diagram of a sheet supplying apparatus.
Figure 3B:
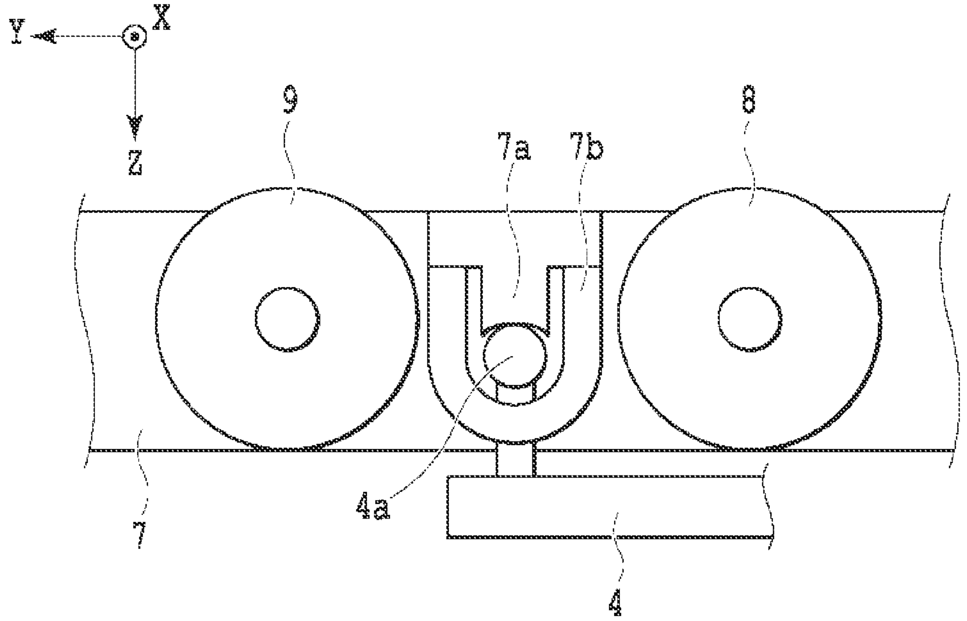
FIG. 3B is an enlarged view of a swing member in FIG. 3A.

FIGS. 3A and 3B are explanatory diagrams of the supplying apparatus 200, and the roll R in FIG. 3A is in a state in which an outer diameter thereof is relatively large. The arm member (mobile body) 4 is attached to the conveyance guide 12 to be rotatable on the arm rotational shaft 5 in directions of arrows A1 and A2. A guide portion 4*b* (lower guide body) guiding the sheet 1 (a front surface or a print surface of the sheet) from an under side is formed on an upper part of the arm member 4, the sheet 1 being pulled out from the roll R. A helical torsion spring 3*c* that presses the arm member 4 in the direction of the arrow A1 is provided between the arm member 4 and a rotating cam 3*a* of the driving unit 3. The rotating cam 3*a* is rotated by a pressing force adjusting motor 34 (sec FIG. 5) to be described later, and force in which the helical torsion spring 3*c* presses the arm member 4 in the direction of the arrow A1 changes in accordance with the rotational position of the rotating cam 3*a*. When the leading end portion of the sheet 1 (a part of the sheet 1 including a leading end) is set in the sheet supply path between the arm member 4 and the separating flapper 10, the pressing three of the arm member 4 by, the helical torsion spring 3*c* is switched to three stages depending on the rotational position of the rotating cam 3*a*. In other words, the pressing force of the arm member 4 is switched to a pressing state by a relatively small force (pressing force of a weak nip), a pressing state by a relatively large force (pressing force of a strong nip), and a pressing three releasing state.

The swing member 7 is swingably attached to the arm member 4, and the first and second driving rotating bodies 8 and 9 which are positioned to deviate in a circumferential direction of the roll R are rotatably mounted to the swing member 7. The driving rotating bodies 8 and 9 move in accordance with an outer shape of the roll R and come into pressure contact with the outer circumferential portion of the roll R from a lower side in the gravity direction in accordance with pressing force against the arm member 4 in the direction of arrow A1. In other words, the driving rotating bodies 8 and 9 come into pressure contact with the outer circumference portion of the roll R from a lower side in the gravity direction than a central shaft of the roll R in the horizontal direction. The pressure contact force is changed in accordance with pressing force of pressing the arm member 4 in the direction of arrow A1.

A plurality of arm members 4 each holding the swing member 7 are provided at a plurality of different positions in the X-axis direction. As illustrated in FIG. 3B, the swing member 7 includes a bearing portion 7*a* and a shaft fastening portion 7*b*, and thus a rotational shaft 4*a* of the arm member 4 is accepted with predetermined looseness.

The bearing portion 7*a* is provided at a gravity center position of the swing member 7 and supported by the rotational shaft 4*a* so that the swing member 7 has a stable attitude in each of the X-axis direction, the Y-axis direction, and the Z-axis direction. Further, since the rotational shaft 4*a* is held with looseness, any of a plurality of swing members 7 are displaced along the outer circumference portion of the roll R depending on the pressing force against the arm member 4 in the direction of the arrow A1. With such a configuration (equalizing mechanism), a change in a pressure contact attitude of the first and second driving rotating bodies 8 and 9 with respect to the outer circumferential portion of the roll R is permitted. As a result, a contact region between the sheet 1 and the first and second driving rotating bodies 8 and 9 is kept at maximum, and the pressing force against the sheet 1 is equalized, and thus a variation the conveyance force of the sheet 1 can be suppressed. Since the driving rotating bodies 8 and 9 come into pressure contact with the outer circumference portion of the roll R, the occurrence of slack in the sheet 1 is suppressed, and conveyance force thereof is enhanced.

In a main body of the printing apparatus 100 (printer main body), the separating flapper 10 positioned above the arm member 4 is attached to be rotatable on the flapper rotational shaft 11 in the directions of the arrows B1 and B2. The separating flapper 10 is configured to lightly press an outer circumferential surface of the roll R by its own weight, in a case in which it is necessary to more strongly press the roll R, biasing force by a biasing member such as a spring may be used. A driven roller (upper contact body) 10*a* is rotatably provided at a contact portion of the separating flapper 10 with the roll R to suppress influence of the pressing force on the sheet 1. A separating portion 10*b* of the leading end of the separating flapper 10 is formed to extend up to a position as close to the outer circumferential surface of the roll R as possible in order to facilitate the separation of the leading end portion of the sheet from the roll R.

The sheet 1 is supplied through the supply path formed between the separating flapper 10 and the arm member 4 after the front surface (print surface) of the sheet is guided by the upper guide portion 4*b* of the arm member 4. Accordingly, it is possible to smoothly supply the sheet 1 using the weight of the sheet 1. Further, since the driving rotating bodies 8 and 9 and the guide portion 4 are moved depending on a change of the outer diameter of the roll R, it is possible to reliably pull out the sheet 1 from the roll R and convey the sheet even when the outer diameter of the roll R changes.

One of the features of the apparatus according to the present embodiment lies in an automatic sheet loading function (an automatic sheet feeding function). In the automatic loading, when the user sets the roll R in the apparatus, the apparatus detects the leading end of the sheet while rotating the roll R in a direction of arrow C2 in FIG. 3A (which is referred to as an opposite direction or a second direction). The second direction is opposite to a rotation direction of the arrow C1 in FIG. 3A (which is referred to as a first direction) in a case where the sheet is supplied. The sensor unit 6 is a unit including a leading end detecting sensor which detects the separation of the leading end portion of the sheet 1 from the outer circumferential surface of the roll R. If the sensor unit 6 detects the separation of the leading end portion of the sheet 1 from the outer circumferential surface of the roll sheet, the apparatus rotates the roll R in the first direction and supplies the leading end portion of the sheet 1 to the inside of the sheet supply path between the arm member 4 and the separating flapper 10. A more detailed procedure of the automatic loading function will be described later.

Further, the printing apparatus 100 of the present example includes the two upper and lower supplying apparatuses 200, and it is possible to perform switching from a state in which the sheet 1 is supplied from one supplying apparatus 200 to a state in which the sheet 1 is supplied from the other supplying apparatus 200. In this case, one supplying apparatus 200 rewinds the sheet 1 which has been supplied so far on the roll R. The leading end of the sheet 1 is evacuated up to the position at which it is detected by sensor unit 6.

Figure 4:
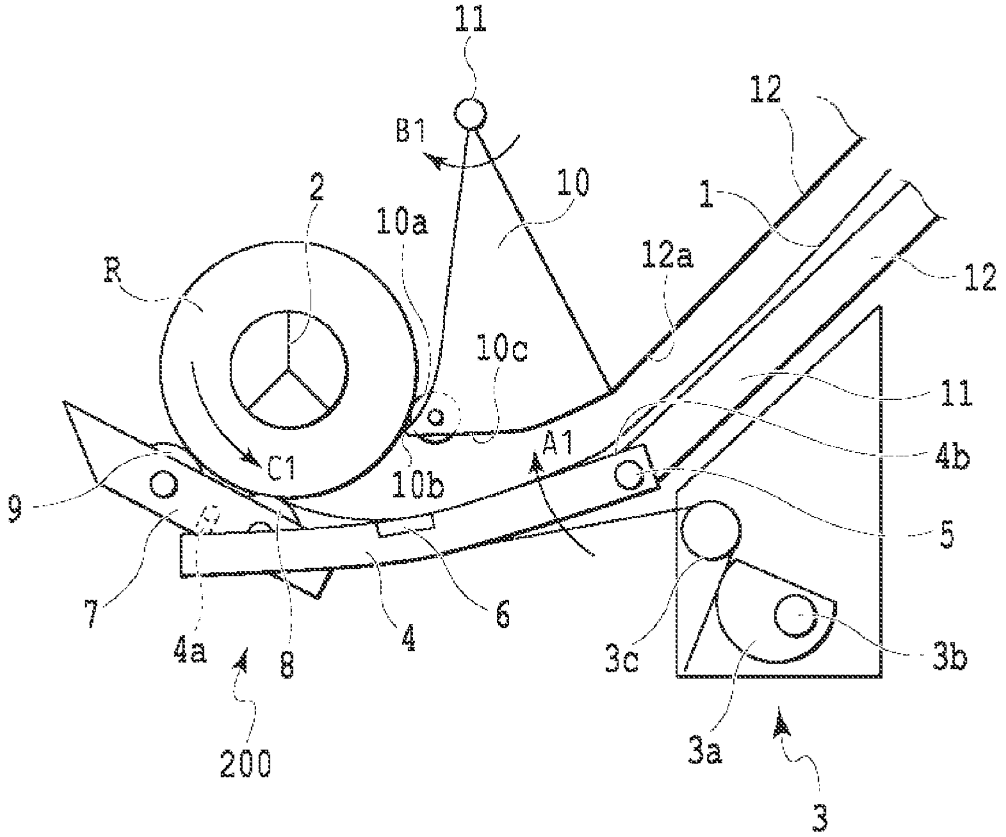
FIG. 4 is an explanatory diagram of the sheet supplying apparatus when a roll outer diameter is small.

FIG. 4 is an explanatory diagram of the supplying apparatus 200 when the outer diameter of the roll R is relatively small. Since the arm member 4 is pressed in the direction of the arrow A1 by the helical torsion spring 3*c*, the arm member 4 moves in the direction of the arrow A1 in accordance with a decrease in the outer diameter of the roll R. Further, by rotating the rotating cam 3*a* in accordance with the change in the outer diameter of the roll R, the pressing force of the arm member 4 by the helical torsion spring 3*c* can be maintained within a predetermined range even though the outer diameter of the roll R changes. Since the separating flapper 10 is also pressed in the direction of arrow B1, the separating flapper 10 moves in the direction of arrow B1 in accordance with the decrease in the outer diameter of the roll R. Accordingly, even when the outer diameter of the roll R is decreased, the separating flapper 10 forms the supply path with the conveyance guide 12 and guides the upper surface of the sheet 1 by a lower surface 10*c*. As described above, the arm member 4 and the separating flapper 10 are rotated in accordance with the change in the outer diameter of the roll R, and thus even when the outer diameter of the roll R is changed, the supply path having a substantially constant size is formed between the arm member 4 and the separating flapper 10.

Figure 5:
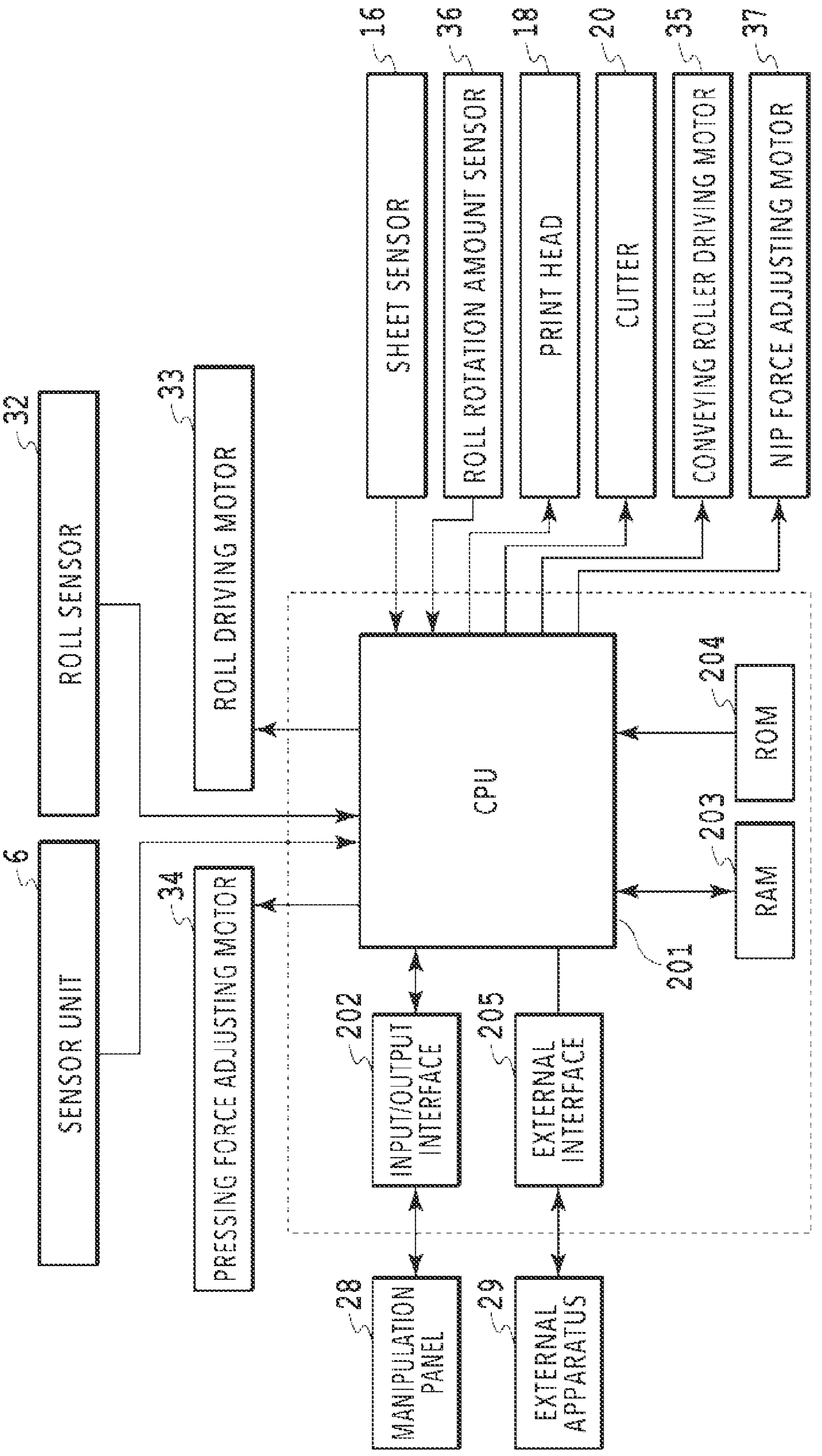
FIG. 5 is a block diagram for describing a control system of the printing apparatus.

FIG. 5 is a block diagram for describing a configuration example of a control system in the printing apparatus 100. The CPU 201 of the printing apparatus 100 controls the respective units of the printing apparatus 100 including the supplying apparatus 200, the sheet conveying unit 300, and the printing unit 400 in accordance with a control program stored in a ROM 204. A type and a width of the sheet 1, various setting information, and the like are input to the CPU 201 from the manipulation panel 28 via an input/output interface 202. Further, the CPU 201 is connected to various external apparatuses 29 including a host apparatus such as a personal computer via an external interface 205, and exchanges various information such as print data with the external apparatus 29. Further, the CPU 201 performs writing and reading of information related to the sheet 1 and the like on a RAM 203. The motor 33 is a roll driving motor for rotating the roll R normally or reversely through the spool member 2, and constitutes a driving mechanism (rotation mechanism) capable of rotationally driving the roll R. The pressing force adjusting motor 34 is a motor for rotating the rotating cam 3*a* in order to adjust the pressing force against the arm member 4. The conveying roller driving motor 35 is a motor for rotating the conveying roller 14 normally or reversely. A roll sensor 32 is a sensor for detecting the spool member 2 of the roll R when the roll R is set in the supplying apparatus 200. A roll rotation amount sensor 36 is a sensor (rotation angle detection sensor) for detecting a rotation amount of the spool member 2, and is, for example, a rotary encoder that outputs pulses which correspond in number to the rotation amount of the roll R.

<Sheet Supply Preparation Process>

Figure 6:
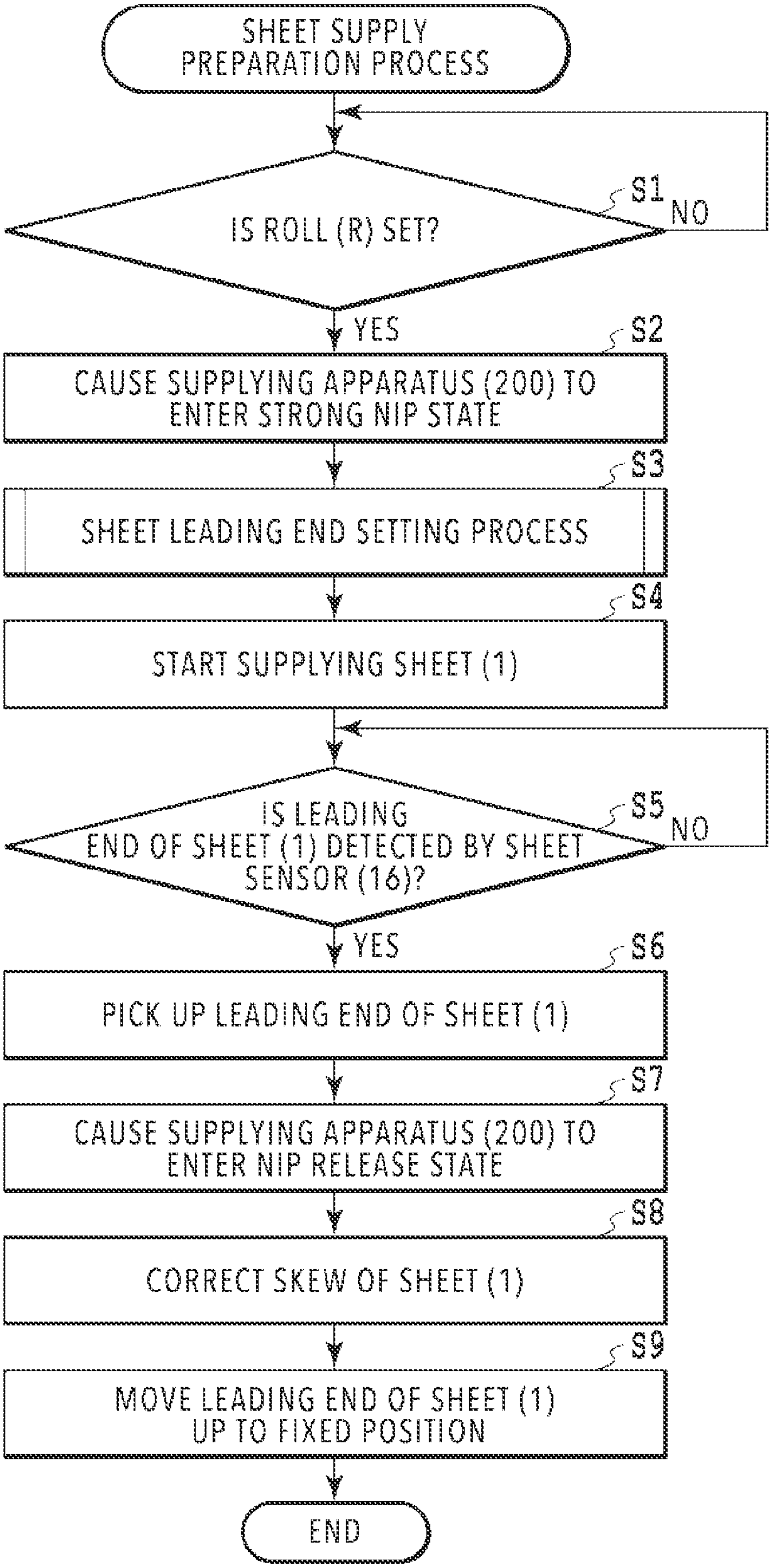
FIG. 6 is a flowchart of a sheet supply preparation process.

FIG. 6 is a flowchart for describing a supply preparation process of the sheet 1 starting from the setting of the roll R.

The CPU 201 of the printing apparatus 100 stands by in a state in which the arm member 4 is pressed in the direction of the arrow A1 by "weak pressing force" (a weak nip state), and first determines whether the roll R is set or not (step S1). In the present example, when the roll sensor 32 detects the spool member 2 of the roll R, the roll R is determined to be set. After the roll R is set, the CPU 201 switches a state in which the am member 4 is pressed in the direction of the arrow A1 by "strong pressing force" strong nip state) (step S2). Then, the CPU 201 executes a sheet leading end setting process in which the leading end portion of the sheet 1 is set in the sheet supply path between the arm member 4 and the separating flapper 10 (step S3). With the sheet leading end setting process (automatic loading), the leading end portion of the sheet 1 is set (inserted) in the sheet supply path. The sheet leading end setting process will be described later in detail.

Thereafter, the CPU 201 rotates the roll R in the direction of the arrow C1 by the roll driving motor 33 and starts supplying the sheet 1 (step S4). When the leading end of the sheet 1 is detected by a sheet sensor 16 (step S5), the CPU 201 normally rotates the conveying roller 14 in the direction of arrow D1, nips the leading end of the sheet 1 together with the nip roller 15, and then stops the motor 33 and the motor 35 (step S6). Thereafter, the CPU 201 cancels the pressing force of pressing the arm member 4 in the direction of arrow A1, and causes the first and second driving rotating bodies 8 and 9 to be separated from the roll R (to enter a nip release state) (step S7).

Thereafter, the CPU 201 determines whether the sheet is conveyed (skewed) in a state in which the sheet is obliquely inclined in the sheet conveying unit 300. Specifically, the sheet 1 is conveyed by a predetermined amount in the sheet conveying unit 300, and an amount of skew occurring at that time is detected by a sensor installed in a carriage including the print head 18 or installed in the sheet conveying unit 300. When the amount of skew is larger than a predetermined allowable amount, the sheet 1 is repeatedly fed or back-fed with the normal rotation and the reverse rotation of the conveying roller 14 and the roll R while applying back tension to the sheet 1. With this operation, the skew of the sheet 1 is corrected (step S8). As described above, when the skew of the sheet 1 is corrected or when an operation of printing an image on the sheet 1 is performed, the supplying apparatus 200 is set to enter the nip release state. Thereafter, the CPU 201 causes the sheet conveying unit 300 to move the leading end of the sheet 1 to a standby position (a fixed position) before printing starts in the printing unit 400 (step S9). Accordingly, the preparation for supplying the sheet 1 is completed. Thereafter, the sheet 1 is pulled out from the roll R with the rotation of the roll R and conveyed to the printing unit 400 by the sheet conveying unit 300.

<Sheet Leading End Setting Process>

FIGS. 7 to 9C are explanatory diagrams of the sheet leading end setting process (step S20) of FIG. 5 in the printing apparatus 100. In the present example, an optical sensor whose output varies in accordance with an interval with the sheet 1 (a surface to be printed by the printing unit or an outer surface of the sheet corresponding to an outer circumferential surface in the roll) is used as the sensor unit 6. Then, after the separation of the leading end portion of the sheet 1 from the outer circumferential surface of the roll R is detected on the basis of a change in the output of the sensor unit 6 during the rotation of the roll R in the reverse direction (the direction of arrow C2), the roll R is rotated in the forward direction of arrow C1 to supply the sheet 1.

Figure 7:
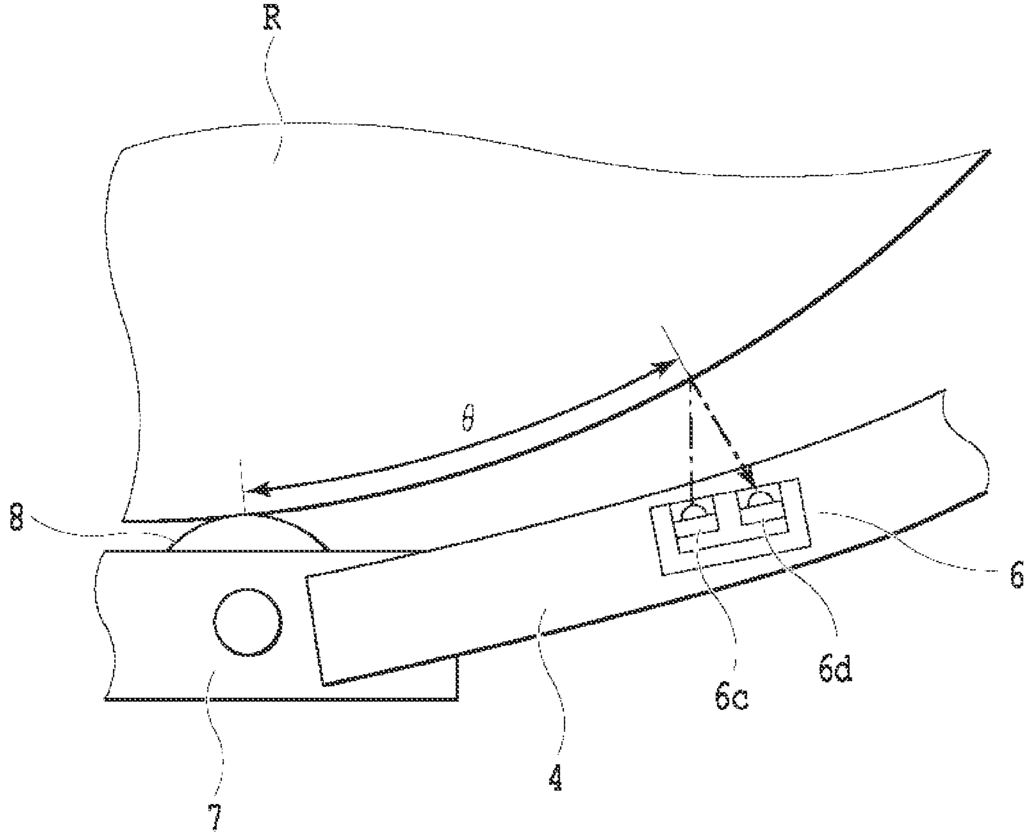
FIG. 7 is an explanatory diagram of a sensor unit.
Figure 8:
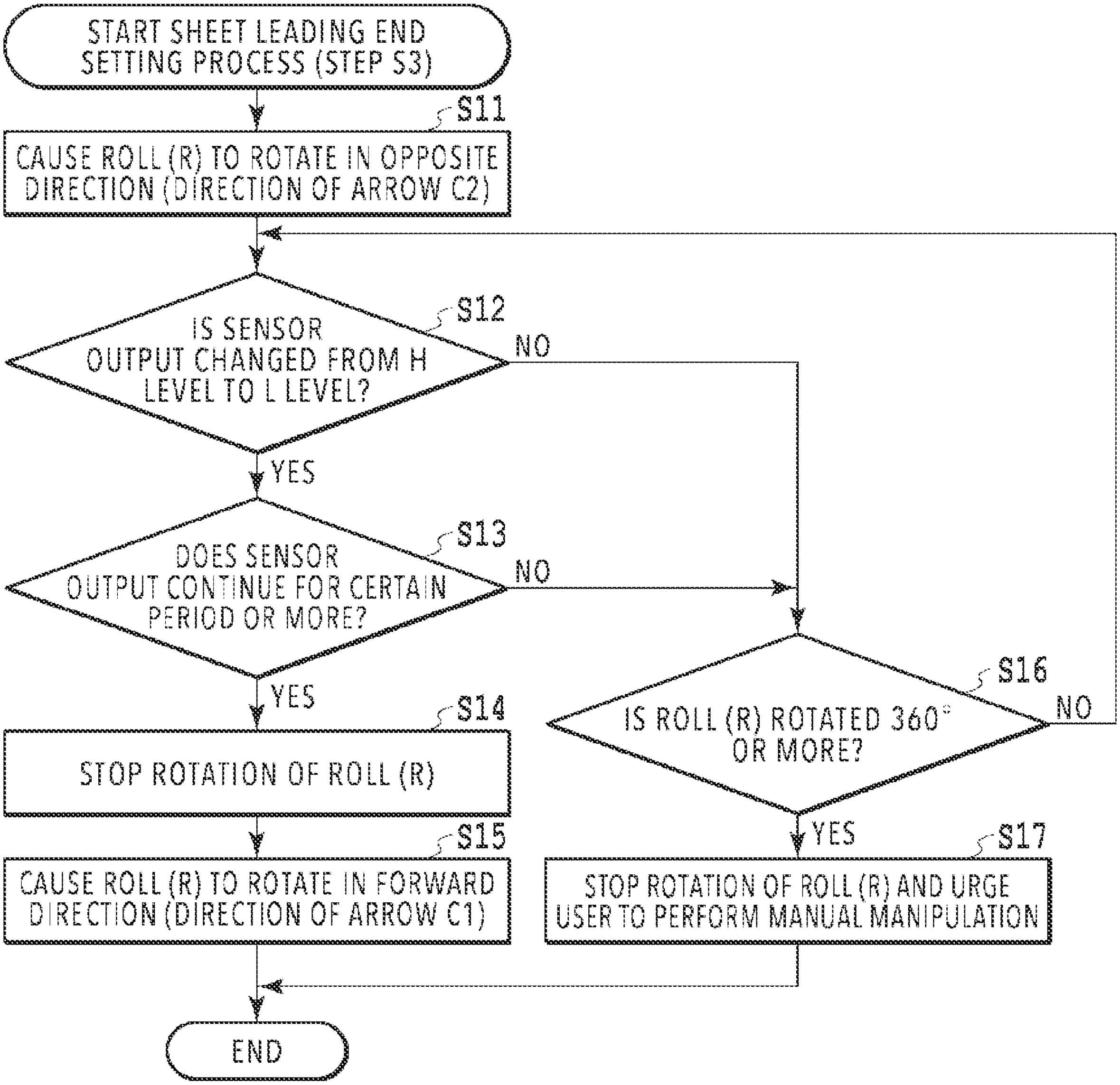
FIG. 8 is a flowchart for describing a sheet leading end setting process.

A light emitting unit 6*c* such as an LED and a light receiving unit 6*d* such as a photodiode are incorporated into the sensor unit 6 of the present example as illustrated in FIG. 7. Light irradiated from the light emitting unit 6*c* toward the roll R is reflected by the front surface of the sheet 1 in the roll R and then detected by the light receiving unit 6*d*. The light which is irradiated from the light emitting unit 6*c* and then detected by the light receiving unit 6*d* includes regular reflection light reflected from the front surface of the sheet 1 in the roll R. An output value of the light receiving unit 6*d* varies in accordance with an interval between the sensor unit 6 and the front surface of the sheet 1 (the print surface on which printing is performed by the printing unit). In other words, the output value of the light receiving unit 6*d* increases as the distance (interval) between the sensor unit 6 and the sheet 1 decreases and decreases as the distance (interval) increases. As long as the sensor unit 6 is configured to change an output value of a detection signal in accordance with the distance between the sensor unit 6 and the sheet 1, the light emitting unit 6*c* and the light receiving unit 6*d* are not limited to the LED and the photodiode. Further, the light detected by the light receiving unit 6*d* is not limited to the regular reflection light. The sensor unit 6 is connected to the CPU 201 (see FIG. 5), and the CPU 201 acquires a detection result of the sensor unit 6 at an arbitrary timing.

FIGS. 8, 9A, 9B, and 9C are explanatory diagrams of the sheet leading end setting process (step S3 in FIG. 6) using the sensor unit 6. As described above, the sheet leading end setting process (automatic loading) is a process of automatically inserting the leading end portion of the sheet 1 of the roll R into the sheet supply path between the arm member 4 and the separating flapper 10 after the roll R is set, and feeding the sheet 1. The arm member 4 faces the front surface of the sheet 1 (print surface or the outer surface of the roll sheet), and the separating flapper 10 faces the back surface of the sheet 1 (the inner surface of the roll sheet).

The CPU 201 determines whether the roll R is set or not (step S1 in FIG. 6). In the present example, the roll R is determined to be set when the roll sensor 32 detects the spool member 2 of the roll R. After the roll R is set, the CPU 201 performs switching to the state in which the arm member 4 is pressed in the direction of arrow A1 by "strong pressing force" (the strong nip state) (step S2 in FIG. 6).

Figure 9A:
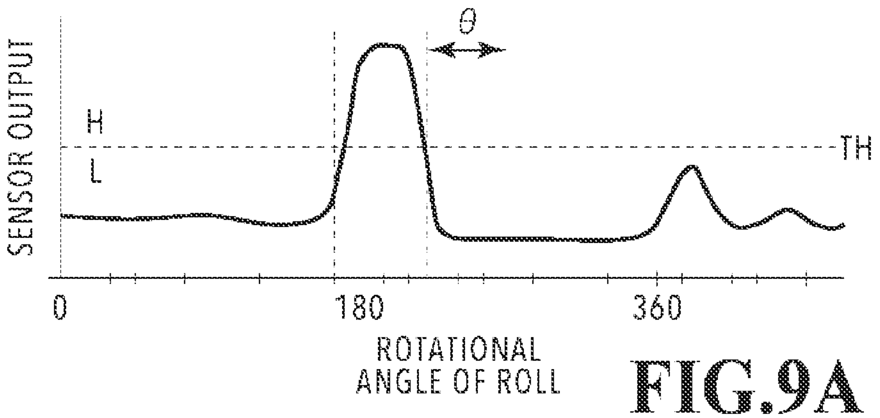
FIGS. 9A, 9B, and 9C are explanatory diagrams of a relation between an output of the sensor unit and a position of a leading end portion of a sheet.

In the subsequent sheet leading end setting process (step S3 in FIG. 6), the CPU 201 causes the roll R to rotate in the opposite direction of arrow C2 (reversely rotated) (step S11). Then, during the reverse rotation of the roll R, it is determined whether the output (sensor signal level) of the detection signal of the sensor unit 6 changes from within a H level range (within a first level range) to within an L level range (within a second level range) (step S12). FIG. 9A is an explanatory diagram of an example of a waveform of a sensor output, and a rotational angle of the roll R at the start of reverse rotation of the roll R is set to 0°.

Figure 9B:
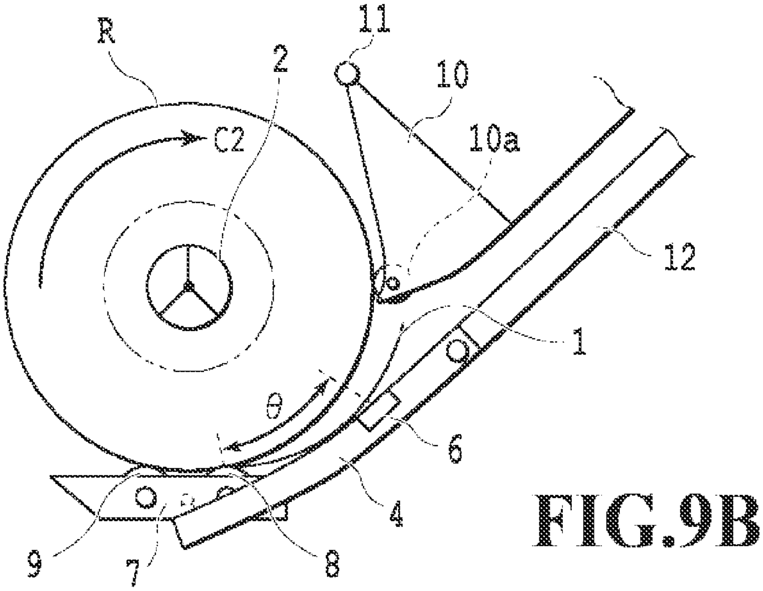
Figure 9C:
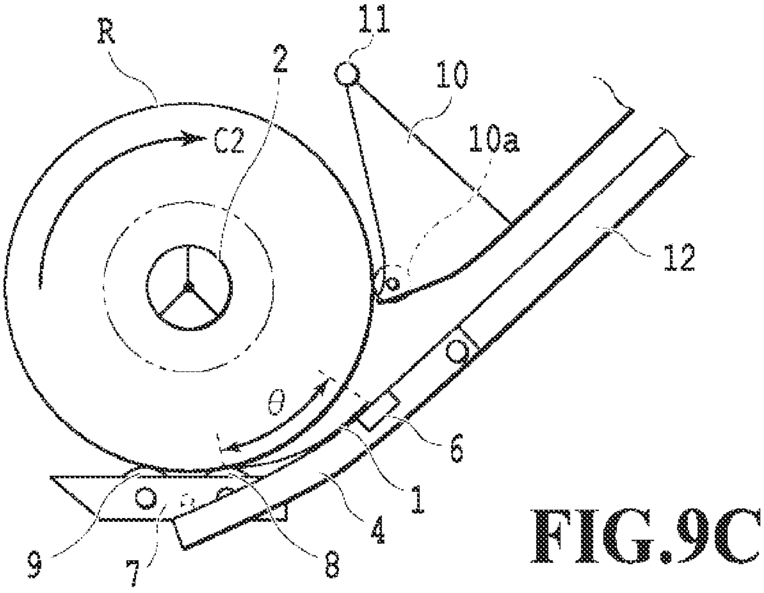

In the present example, when the roll R is reversely rotated by 170°, the leading end portion of the sheet 1 approaches the sensor unit 6 as illustrated in FIG. 9B, and the sensor output changes from an F level to an H level as illustrated in FIG. 9A. Specifically, when the roll R is reversely rotated by 170°, the leading end portion of the sheet 1 passes through the position of the driven roller **10*a* of the separating flapper 10, the leading end portion of the sheet 1 falls down onto the arm member 4 by its own weight, and the leading end portion of the sheet 1 approaches the sensor unit 6 as illustrated in FIG. 9B. Thereafter, when the roll R is reversely rotated by 200°, the leading end portion of the sheet 1 passes over the sensor unit 6 as illustrated in FIG. 9C, the sensor unit 6 receives the reflection light from the front surface of the roll R again, and the sensor output changes to the L level. Thereafter, when the roll R is further reversely rotated by an angle θ, the leading end portion of the sheet 1 passes through the position of the driven rotating body 8**.

The H level and the L level are obtained by dividing the output strength of the sensor unit 6 into 2 levels, and the H level is output when the interval between sensor unit 6 and the sheet 1 of the roll R is small, and the L level is output when the interval is large. A threshold value TH as a boundary dividing these levels is stored in a non-volatile memory inside the printer main body or the sensor unit 6. The threshold value TH is set on the basis of sensor outputs L0 and H0. In other words, the threshold value TH is set on the basis of an intermediate value between a minimum level and a maximum level of the sensor output when the roll R is rotated once or more (for example, a plurality of times). For example, when the sensor output of the minimum level is L0, and the sensor output of the maximum level is H0, the threshold value TH can be set as the intermediate value (TH=(H0+L0)/2) of the sensor outputs L0 and H0. Since the threshold value TH fluctuates due to a variation of the sensor unit 6 or the like, it is preferable to measure the sensor outputs L0 and H0 for each individual sensor unit 6 and set the threshold value TH on the basis of the measured values.

As illustrated in FIG. 9B, when the leading end portion of the sheet 1 passes through the sensor unit 6, the sensor output changes from the H level to the L level, and thereafter when the L level of the sensor output continues for a certain period, the rotation of the roll R is stopped (steps S13 and S14). Specifically, after the sensor output changes from the H level to the L level, it is further determined whether or not the sensor output continuously has the L level during a certain period in which the roll R is reversely rotated a certain angle A, and the rotation of the roll R is stopped when the sensor output continuously has the L level during the certain period. The certain angle A is an angle smaller than the angle θ, and in the case of the present example, the certain angle A is half the angle θ (A=θ/2). When the rotation of the roll R is stopped in step S14, the leading end portion of the sheet 1 is positioned on the arm member 4 between the sensor unit 6 and the driving rotating body 8. Thereafter, when the roll R is normally rotated in the direction of arrow C1 (step S15), the leading end portion of the sheet 1 can be automatically inserted and fed into the sheet supply path between the arm member 4 and the separating flapper 10 (automatic loading).

In a case where the sensor output does not change from the H level to the L level even if the roll R performs one or more reverse rotations (360° or more) or in a case where the L level of the sensor output is not continued for a certain period even if the roll R performs one or more reverse rotations, the process proceeds from step S16 to step S17. In other words, in a case where the leading end portion of the sheet 1 is not moved away from the outer circumferential surface of the roll R while the roll R performs one rotation or in a case where the leading end of the sheet 1 moved away from the outer circumferential surface of the roll R does not move above the sensor unit 6, the process proceeds to step S17. In step S17, the rotation of the roll R is stopped, and a notification indicating that the automatic loading (automatic feeding) was unable to be executed is given to the user to urge the user to perform a manual manipulation (manual sheet feeding) for inserting the leading end portion of the sheet 1 into the sheet supply path.

As described above, in the present embodiment, after the roll R is set, the leading end portion of the sheet 1 can be automatically inserted into the sheet supply path and fed. Therefore, the user need not manually insert the leading end portion of the sheet 1 into the sheet supply path after the roll R is set, thereby reducing the work load when setting the roll R.

Embodiments of the present invention in which a plurality of sensor units 6 are installed in the basic configuration of the printing apparatus 100 will be described below.

First Embodiment

Figure 10:
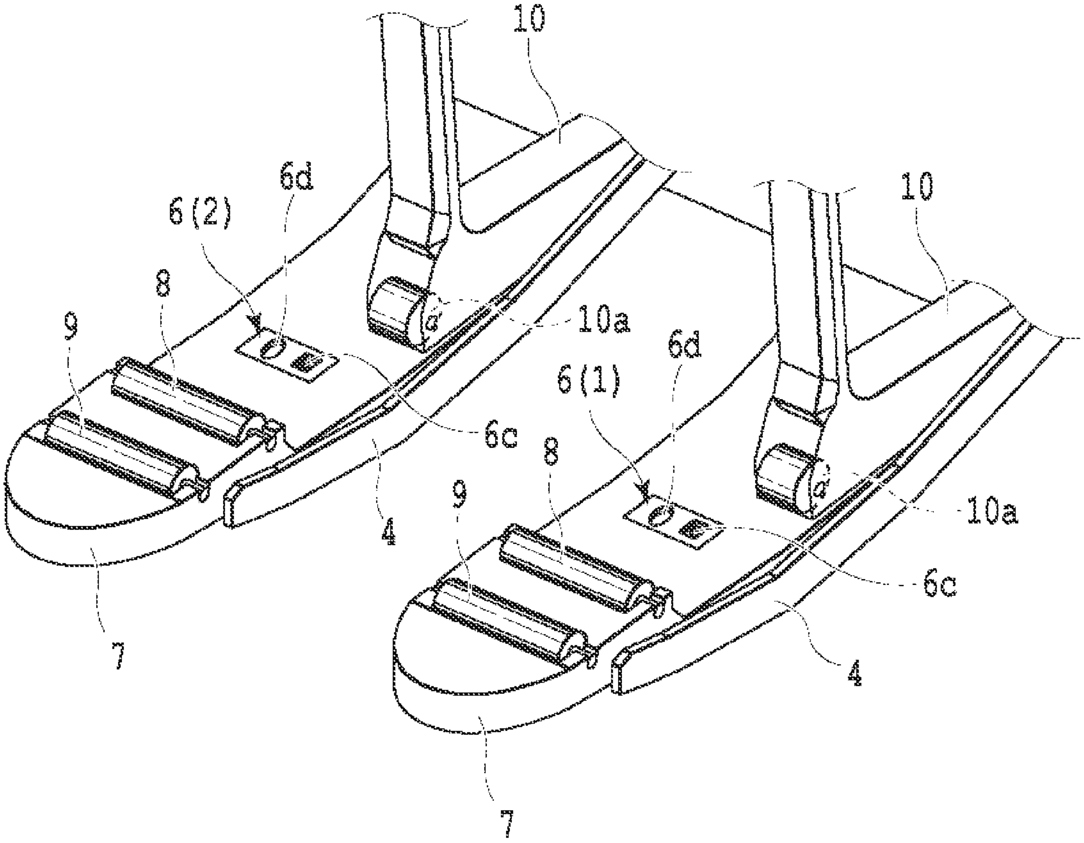
FIG. 10 is an explanatory diagram of a main part of a printing apparatus according to a first embodiment of the present invention.
Figure 11A:
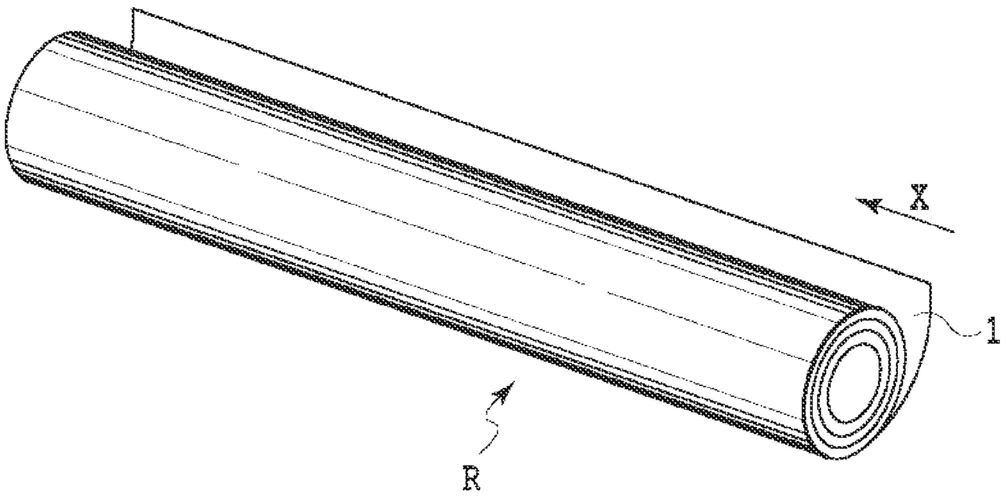
FIGS. 11A and 11B are explanatory diagrams of different cut states of a leading end portion of the sheet.
Figure 11B:
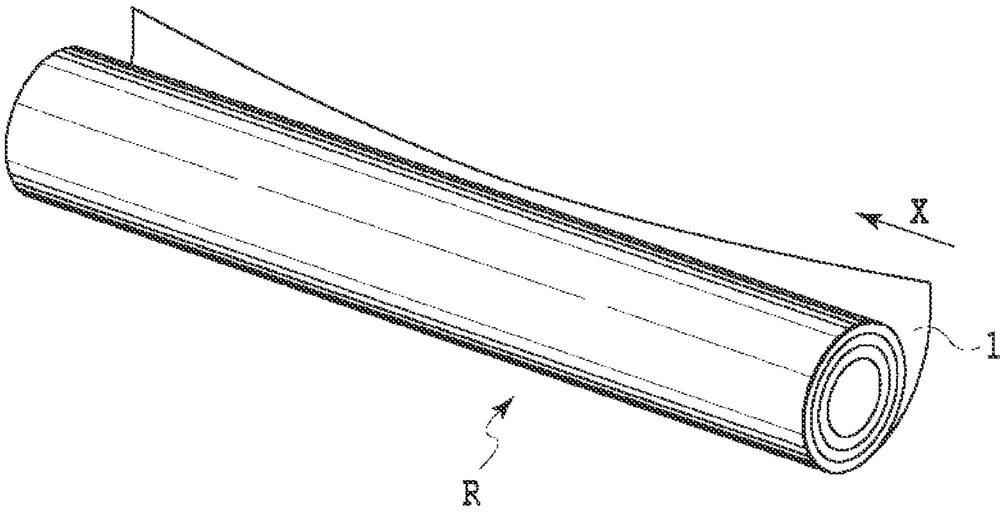
Figure 12A:
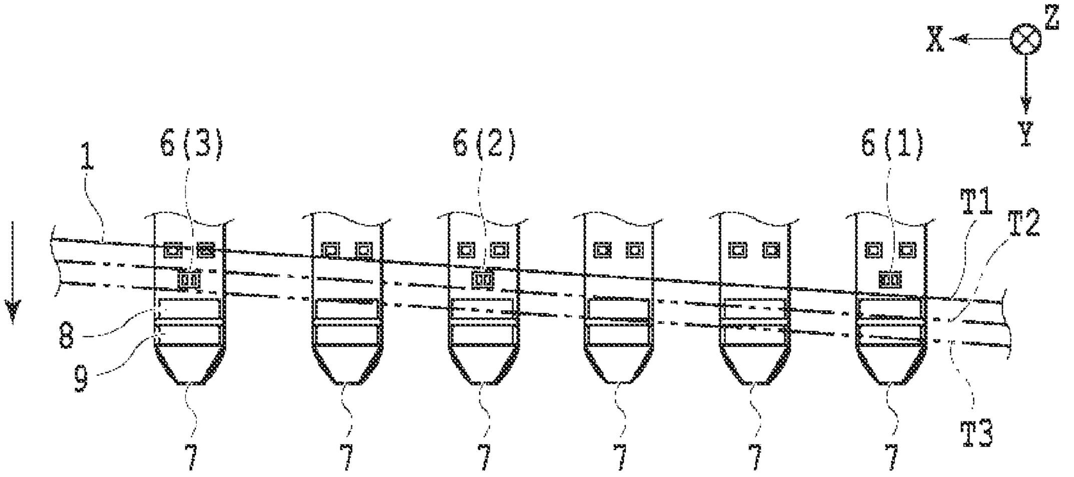
FIGS. 12A and 12B are explanatory diagrams of position relations between leading end portions of sheets having different cut states and a sensor unit.
Figure 12B:
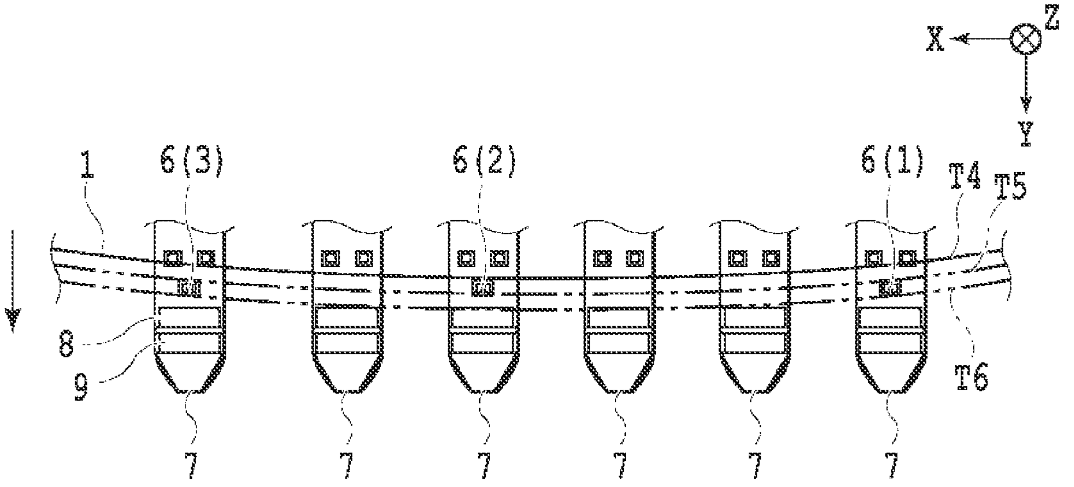

In the present embodiment, as illustrated in FIG. 10, the sensor unit 6 is installed in each of a plurality of arm members 4 which are positioned to deviate from each other in the width direction of the roll R. It is not necessary to install the sensor unit 6 in all of the plurality of arm members 4; for example, in a case where the width of the sheet 1 is a standard size such as 24 inches, 36 inches, or 44 inches, the sensor unit 6 may be installed only in the arm members 4 positioned nearby the end portions of the sheet 1. In the case of the present example, a total of three sensor units 6 (6(1), 6(2), and 6(3)) are installed in three of six arm members 4 as illustrated in FIGS. 12A and 12B. The number of arm members 4 and the sensor units 6 to be installed is not limited to three. There are cases where the leading end of the sheet 1 is oblique as illustrated in FIG. 11A, for example, when the user manually cuts the sheet 1 using scissors or the like. There are cases where the leading end of the sheet is cut curvedly when the user manually tears the sheet. Further, there are cases where both end portions of the leading end of the sheet are floating as illustrated in FIG. 11B. This is a form in which the center portion of the roll is fixed using tape, and only both end parts of the roll are apart from it.

Figure 13A:
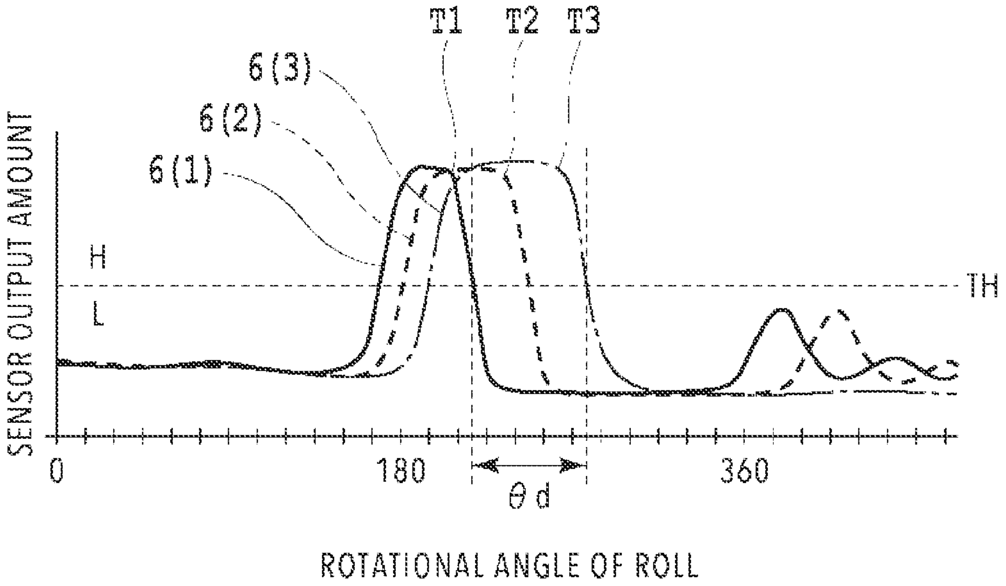
FIGS. 13A and 13B are explanatory diagrams of different examples of a sensor output of the sensor unit.

FIG. 12A is an explanatory diagram of a position relation between the sheet 1 with an oblique leading end as illustrated in FIG. 11A and the sensor unit 6. In a case where the sheet 1 is conveyed in the Y axis direction, the position of the leading end changes as indicated by T1, T2, and T3 in FIG. 12A, and the sensor output of the sensor unit 6 changes as illustrated in FIG. 13A. As described above, when the roll R performs the reverse rotation in the direction of arrow C2, the leading end portion of the sheet 1 passes through the driven roller **10*a* of the separating flapper 10, then falls down due to its own weight to approach the sensor unit 6, and the sensor output changes from the L level to the H level. Thereafter, when the leading end portion of the sheet 1 passes through the position of sensor unit 6 with the reverse rotation of the roll R, the sensor output changes from the H level to the L level. Therefore, in a case where the leading end of the sheet 1 changes as indicated by the positions T1, T2, and T3, the sensor outputs of the sensor units 6(1), 6(2), and 6(3) change from the H level to the L level at timings corresponding to the positions T1, T2, and T3 as illustrated in FIG. 13A. In other words, the sensor output changes from the H level to the L level in the order of the sensor units 6(1), 6(2), and 6(3**).

Figure 13B:
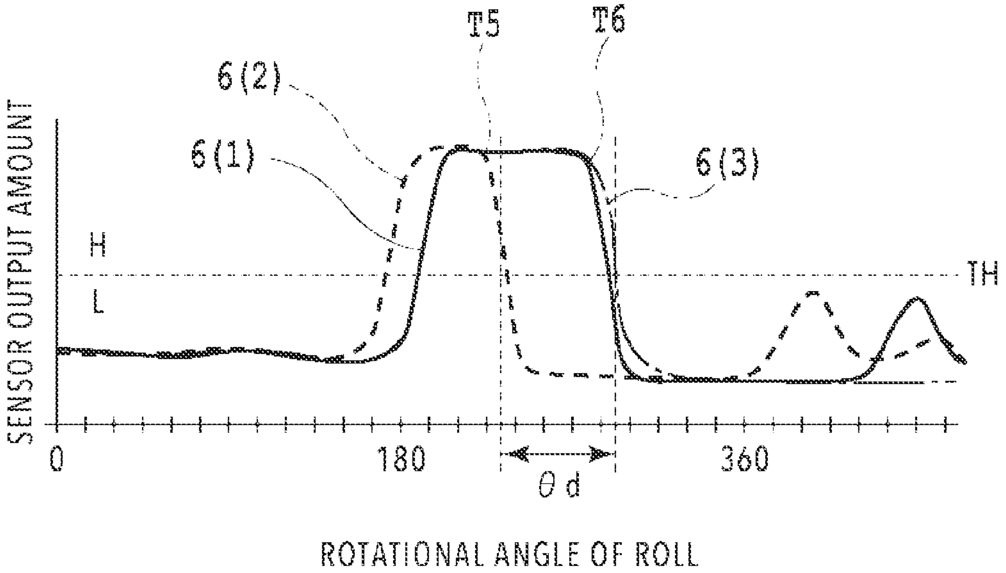

FIG. 12B is an explanatory diagram of a position relation between the sheet 1, in which the center portion is fixed using tape, and both end portions of the leading end are floating as illustrated in FIG. 11B, and the sensor unit 6. In a case where the sheet 1 is conveyed in the Y axis direction, the position of the leading end changes as indicated by T4, T5, and T6 in FIG. 12B, and the sensor output of the sensor unit 6 changes as illustrated in FIG. 13B. In other words, the leading end of the sheet 1 changes as indicated by the positions T4, T5, and T6, and thus the sensor outputs of the sensor units 6(1), 6(2), and 6(3) change from the H level to the L level at timings corresponding to the positions T5 and T6 as illustrated in FIG. 13B. That is, the sensor outputs of the sensor units 6(2) and 6(3) change from the H level to the L level after the sensor output of the sensor unit 6(1) first changes from the H level to the L level.

Figure 14:
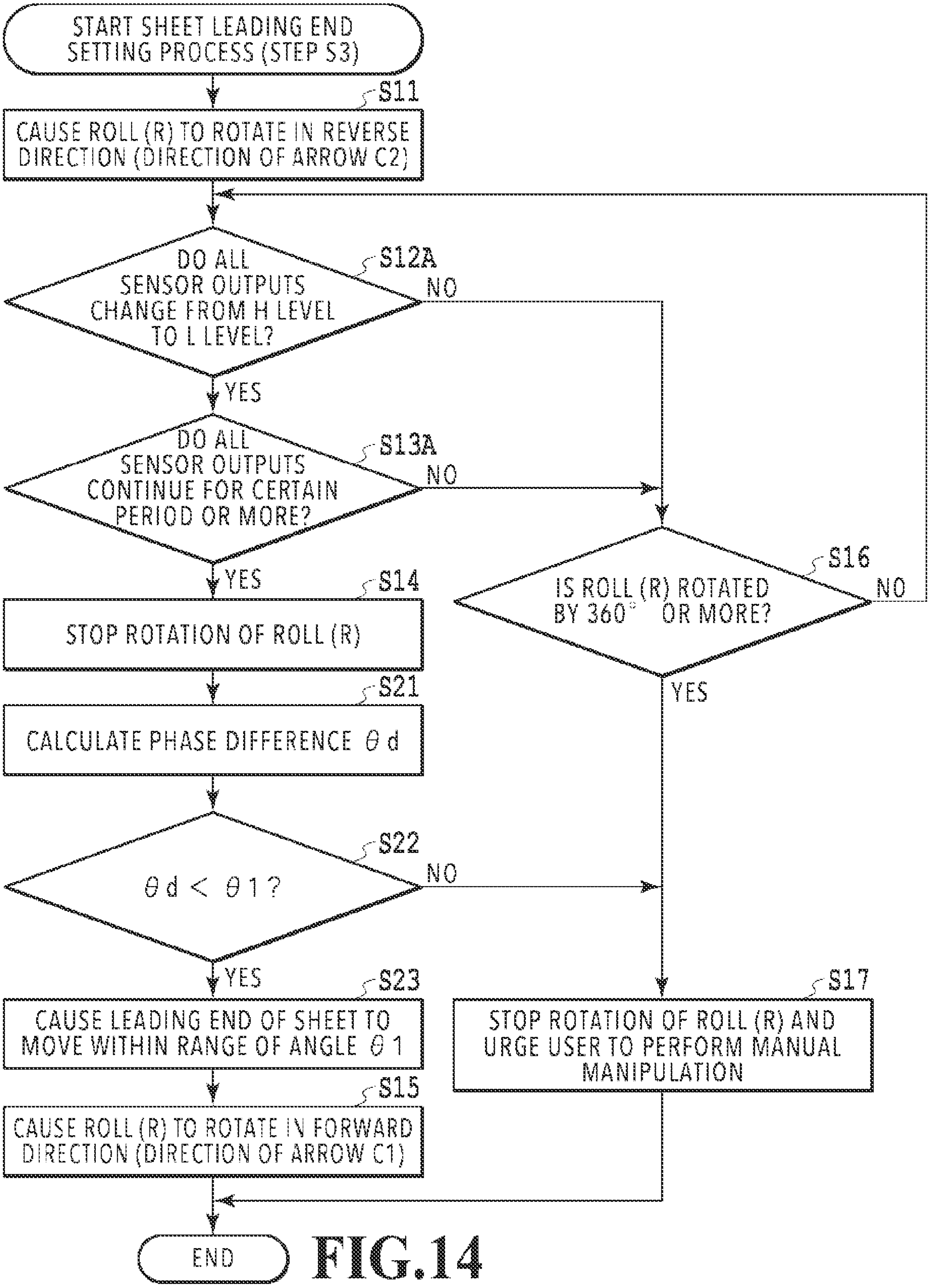
FIG. 14 is a flowchart for describing a sheet leading end setting process according to the first embodiment of the present invention.

FIG. 14 is a flowchart for describing the sheet leading end setting process (step S3) of FIG. 6 in the configuration including a plurality of sensor units 6(1), 6(2), and 6(3). Processes similar to the flowchart of FIG. 8 described above are denoted by the same step numbers, and description thereof will be omitted.

The CPU 201 causes the roll R to perform one or more rotation in the reverse direction of arrow C2 (reverse rotation) (steps S11 and S16). In a case where the sensor outputs of all the sensor units 6 change from a level within the range of the H level to a level within the range of the L level during the reverse rotation of the roll R, and the L levels of all the sensor outputs are continued for a certain period, the rotation of the roll R is stopped (steps S12A, S13A, and S14). If all the sensor outputs do not change from the H level to the L level even if the roll R performs one or more reverse rotations (360° or more), the process proceeds from step S16 to step S17. Further, even when the L levels of all the sensor outputs are not continued for the certain period even if the roll R performs one or more reverse rotations, the process proceeds from step S16 to step S17. In step S17, the rotation of the roll R is stopped, and a notification indicating that the automatic loading is unable to be executed is given to the user to urge the user to perform a manual manipulation (manual sheet feeding) for inserting the leading end portion of the sheet 1 into the sheet supply path. At that time, for example, a message such as "Please feed sheet manually" is displayed for the user.

The process proceeds from step S14 to step S21, and the CPU 201 calculates a rotational angle θd of the roll R in FIGS. 13A and 13B. The rotational angle θd corresponds to a difference (phase difference) between an earliest time point at which the sensor output of each sensor unit changes from the H level to the L level and a latest time point at which the sensor output of each sensor unit changes from the H level to the L level. Thereafter, the CPU 201 compares the rotational angle θd with an angle θ1 (step S22). The angle θ1 is an angle formed by a contact position P1 of the driven roller 10*a* with the outer circumferential surface of the roll R and a contact position P2 of the driven rotating body 8 with the outer circumferential surface of the roll R as illustrated in FIG. 3A. In a ease where the rotational angle θd is smaller than the angle θ1, the CPU 201 determines that the automatic loading can be performed, and causes the roll R to rotate in the forward direction after causing the leading end of the sheet 1 to move within the range of angle θ1 (steps S23 and S15). On the other hand, in a case where the rotational angle θd is equal to or larger than the angle θ1, the CPU 201 determines that the automatic loading is unable to be performed since a partial variation in the position of the leading end of the sheet is large, and the CPU 201 causes the process to proceed to step S17. In other words, the automatic loading is executed when a condition that the detection timing of the separation (peeling) of the leading end portion of the sheet 1 by a plurality of sensor units 6 is within a predetermined angle (corresponding to within a predetermined period of time).

As described above, since a plurality of sensor units 6 are arranged, in a case in which there is a partial variation in the position of the leading end of the sheet 1, the leading end portion of the sheet 1 can be automatically inserted into the sheet supply path and fed in accordance with a degree of the partial variation.

Second Embodiment

Figure 15A:
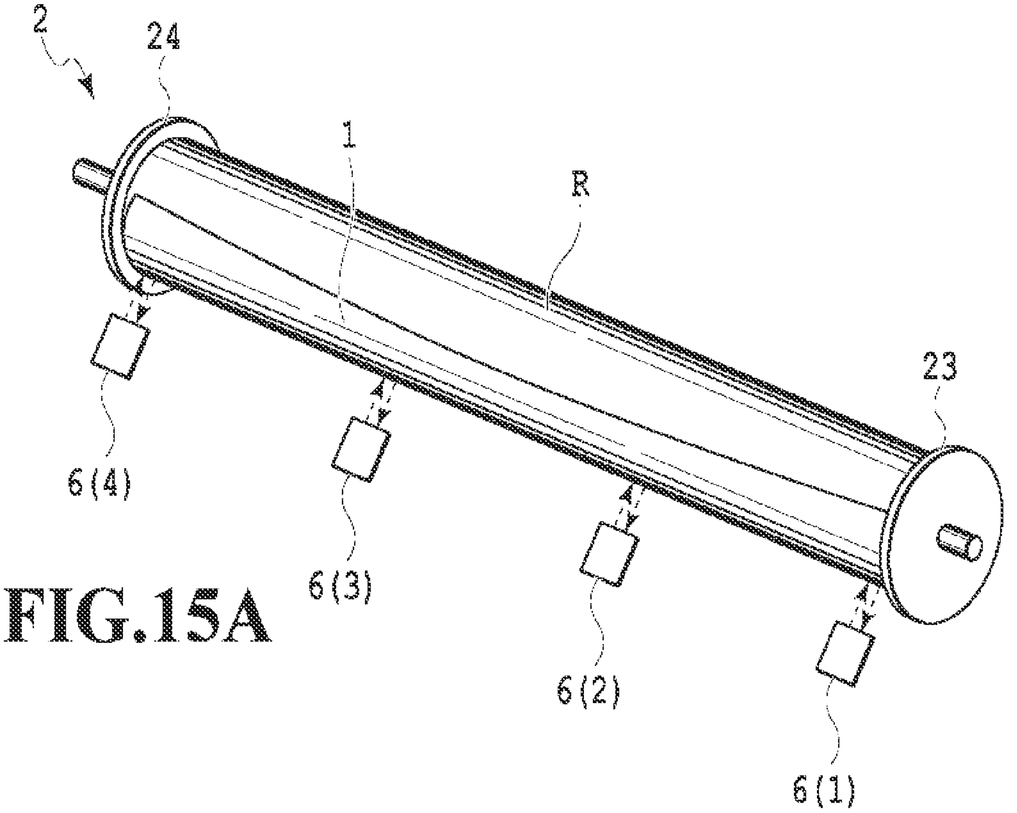
FIGS. 15A and 15B are explanatory diagrams of different examples of a position relation between a roll and a sensor unit.
Figure 15B:
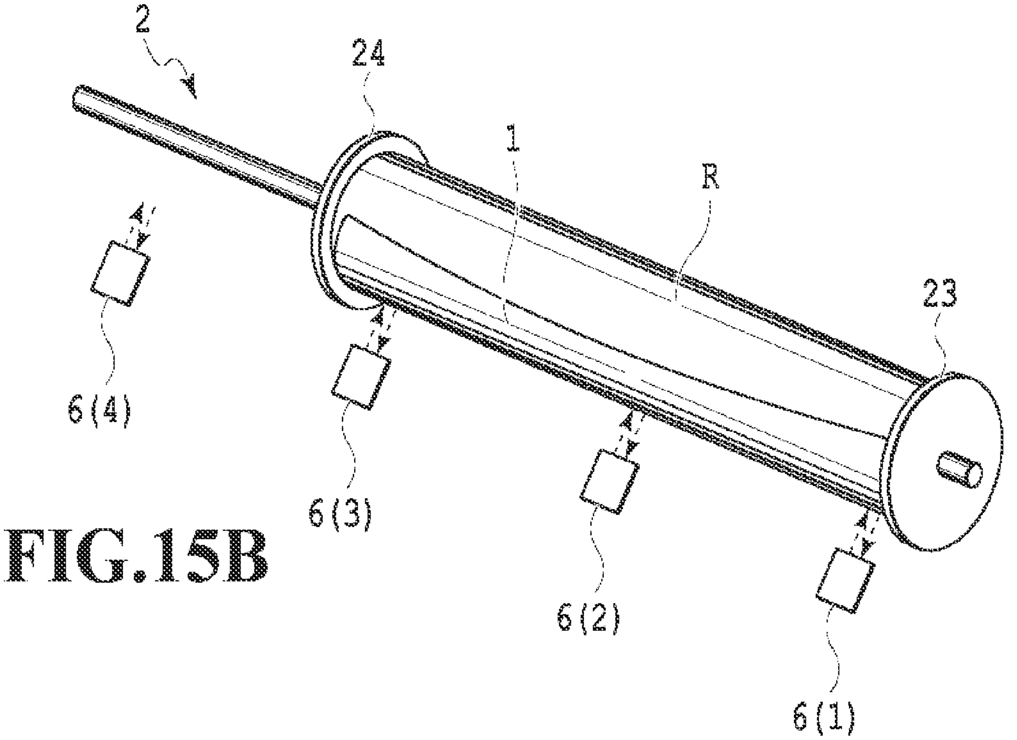

In the present embodiment, a setting state of the roll R is determined by using a plurality of sensor units 6. In the present example, four sensor units 6(1), 6(2), 6(3) and 6(4) are installed to deviate in the axis line direction of the roll R as illustrated in FIGS. 15A and 15B. Each of these sensor units 6 (6(1), 6(2), 6(3), and 6(4)) is installed on the corresponding arm member 4. The spool member 2 on which the roll R is set includes a reference side spool flange 23 and a non-reference side spool flange 24. As illustrated in FIGS. 15A and 15B, the roll R is set on the spool member 2 on the basis of the position of the reference side spool flange 23 facing the one end portion of the roll R. The sensor units 6 are referred to as sensor units 6(1), 6(2), 6(3), and 6(4) in the ascending order of the distances from the reference side spool flange 23.

Figure 18A:
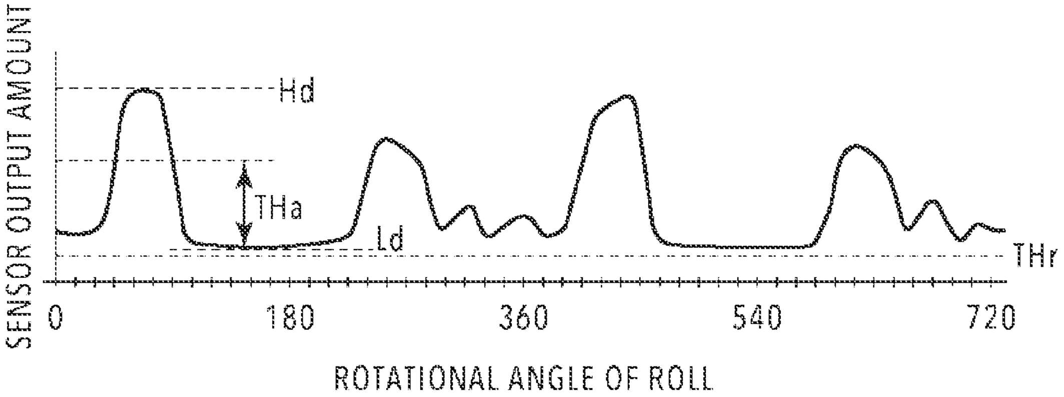
FIGS. 18A to 18C are explanatory diagrams of different examples of a sensor output of the sensor unit.
Figure 18B:
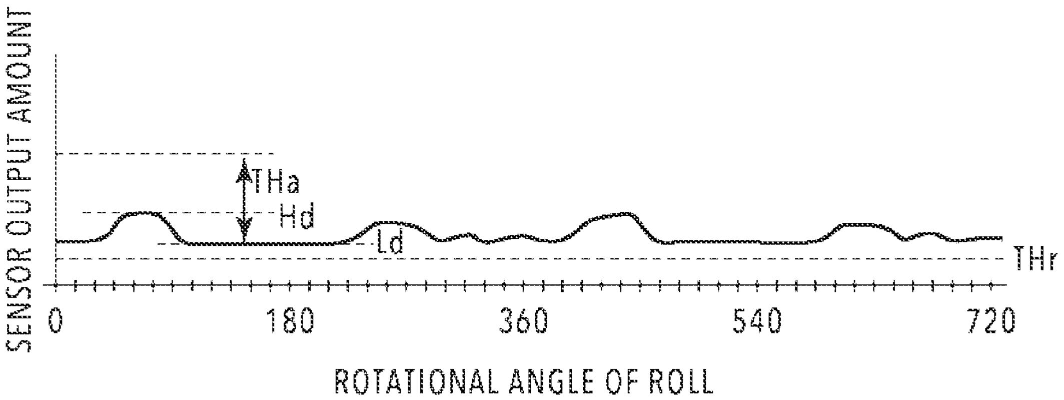
Figure 18C:
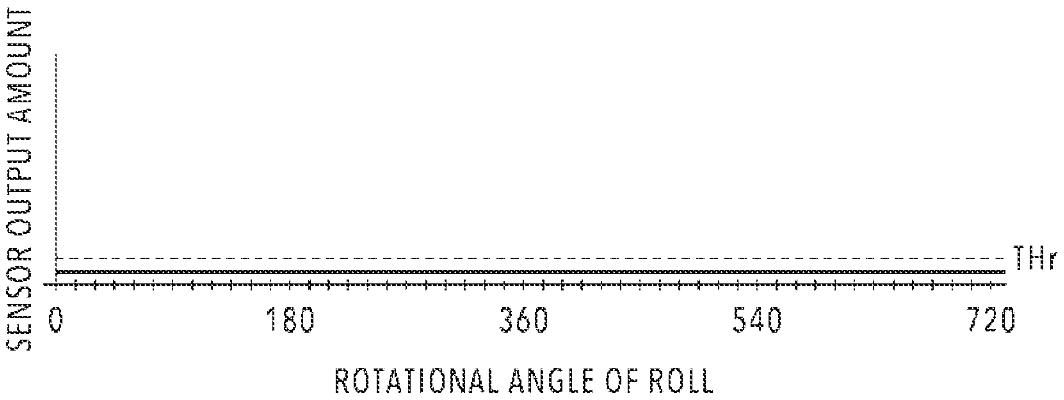

FIG. 15A illustrates a state in which the roll R having a width opposing the sensor units 6(1) to 6(4) is correctly set on the spool member 2. FIG. 15B illustrates a state in which the roll R having a width opposing to the sensor units 6(1) to 6(3) is correctly set on the spool member 2. In the setting state of FIG. 15A, when the roll R performs the reverse rotation, the sensor outputs of the sensor units 6(1) to 6(4) facing the roll R change as illustrated in FIG. 18A. In the setting state of FIG. 15B, when the roll R performs the reverse rotation, the sensor outputs of the sensor units 6(1) to 6(3) facing the roll R change as illustrated in FIG. 18A. The sensor output of the sensor unit 6(4) not facing the roll R does not change as illustrated in FIG. 18C.

Figure 16A:
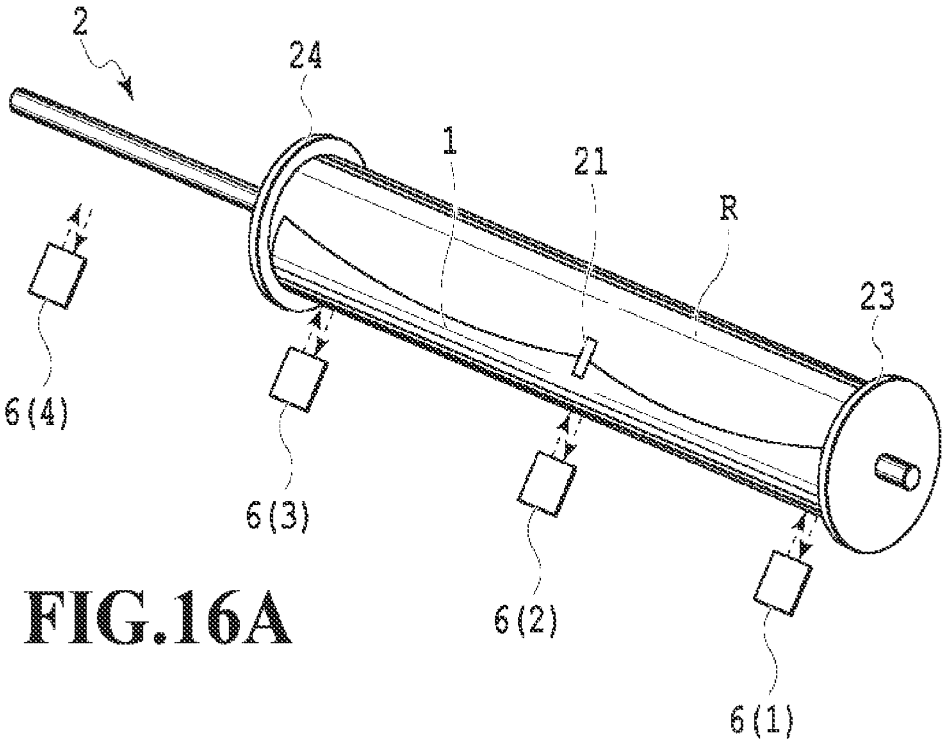
FIGS. 16A and 16B are explanatory diagrams of different examples of a position relation between the roll and the sensor unit.
Figure 16B:
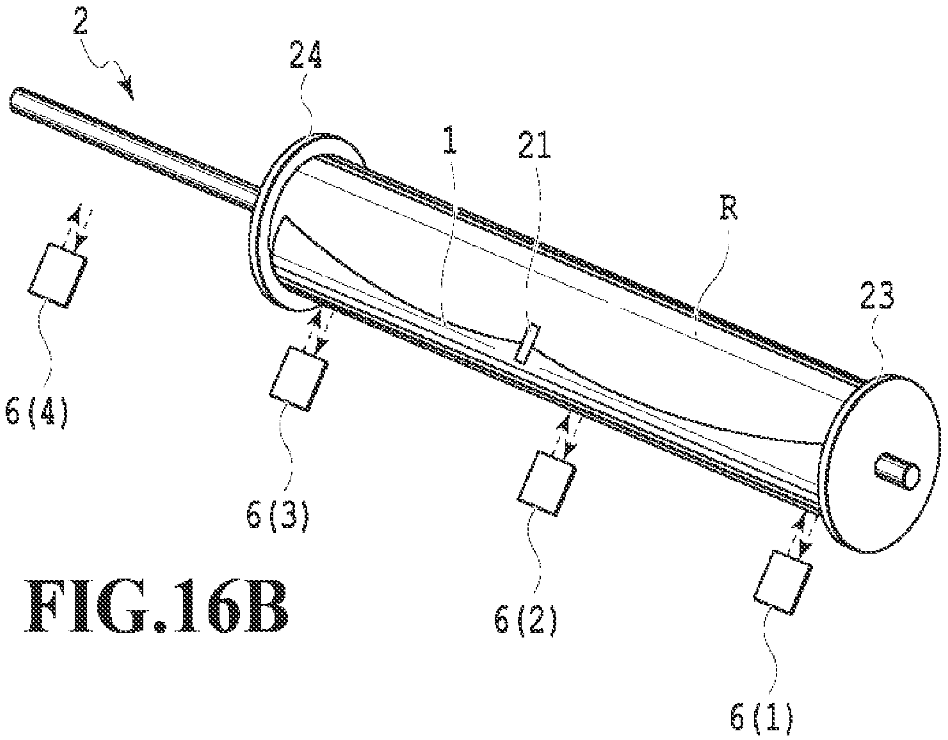

FIGS. 16A and 16B illustrate states in which the roll R having a width opposing the sensor units 6(1) to 6(3) is set on the spool member 2 while being fixed by tape 21 or the like. In FIG. 16A, the tape 21 faces the sensor unit 6(2), and in FIG. 16A, the tape 21 is located between the sensor unit 6(2) and the sensor unit 6(3). In the setting state of FIG. 16A, when the roll R performs the reverse rotation, the sensor output of the sensor unit 6(2) facing the tape 21 changes as illustrated in FIG. 18B. In the setting state of FIG. 16B, when the roll R performs the reverse rotation, the sensor output of the sensor unit 6(2) has a larger amplitude than the sensor output of FIG. 18B and becomes close to the sensor output of FIG. 18A.

Figure 17A:
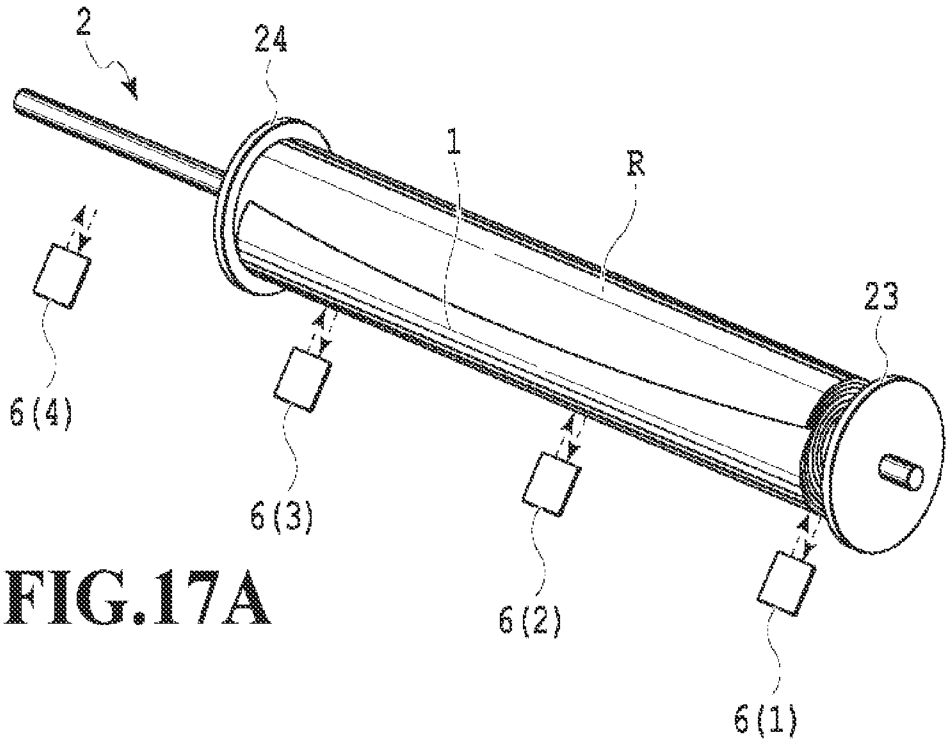
FIGS. 17A and 17B are explanatory diagrams of different examples of a position relation between a roll and a sensor unit.

FIG. 17A illustrates a state in which the roll R having a width opposing the sensor units 6(1) to 6(3) is set on the spool member 2 without being correctly regulated by the reference side spool flange 23. In such a setting state, when the roll R performs the reverse rotation, since the roll R does not exist at the position facing the sensor unit 6(1), the sensor output of the sensor unit 6(1) does not change as illustrated in FIG. 18C. 17B illustrates a state in which the roll R having a width opposing only the sensor unit 6(1) is set on the spool member 2 while being fixed by the tape 21. In such a setting state, when the roll R performs the reverse rotation, the sensor output of sensor unit 6(1) has a larger amplitude than the sensor output of FIG. 18B and becomes close to the sensor output of FIG. 18A.

Figure 19:
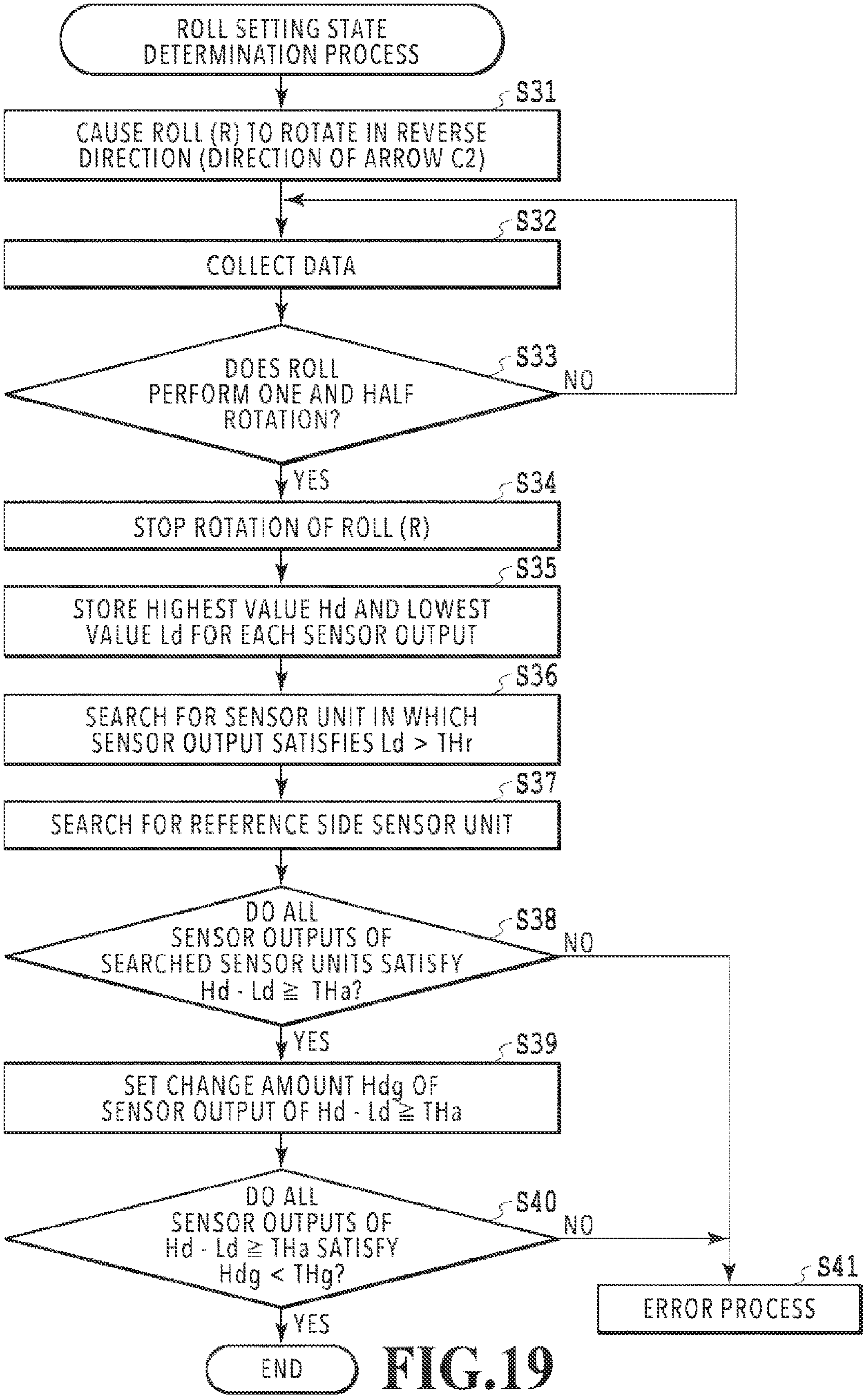
FIG. 19 is a flowchart for describing a roll setting state determination process.

FIG. 19 is a flowchart for describing a determination process of determining the setting state of the roll R using the sensor outputs of the plurality of sensor units 6.

The CPU 201 collects the sensor outputs of the sensor units 6(1), 6(2), 6(3), and 6(4) (data collection) while causing the roll R to perform one and half or more rotations (54° or more) in the reverse direction of arrow C2 (steps S31, S32, and S33). In order to collect the data, it is preferable to cause the roll R to perform at least one rotation. However, it is desirable to cause the roll R to perform one or more rotations in view of the slack of the sheet 1 or the like when the roll R is set.

After the data collection is completed, the CPU 201 stops the rotation of the roll R (step S34), extracts the highest value Hd and the lowest value Ld in the sensor output of each sensor unit 6 as illustrated in FIGS. 18A and 18B, and stores the highest value Hd and the lowest value Ld in the RAM 203 (see FIG. 5) (step S35). The CPU 201 searches for a sensor unit 6 whose sensor output lowest value Ld exceeds a predetermined threshold value THr as a sensor unit 6 facing the roll R (step S36). Then, the CPU 201 searches for a sensor unit (reference side sensor unit) 6 closest to the reference side spool flange 23 in order to check whether or not the roll R is correctly set in the spool member 2 (step S37). In case of the present example, reference side sensor unit 6 is the sensor unit 6(1).

Figure 17B:
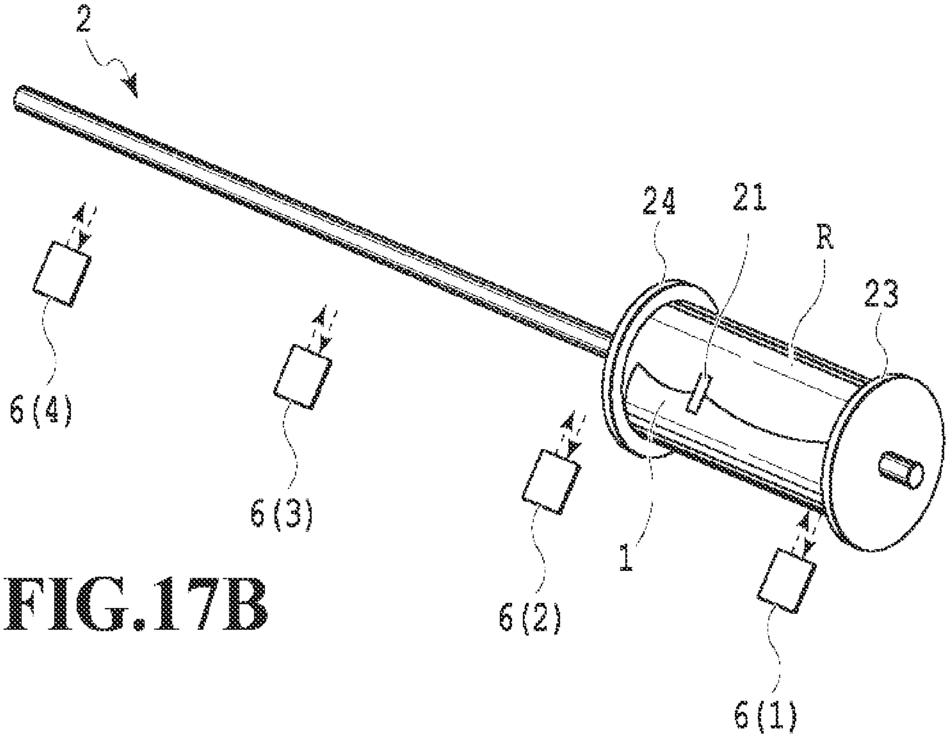
Figure 20A:
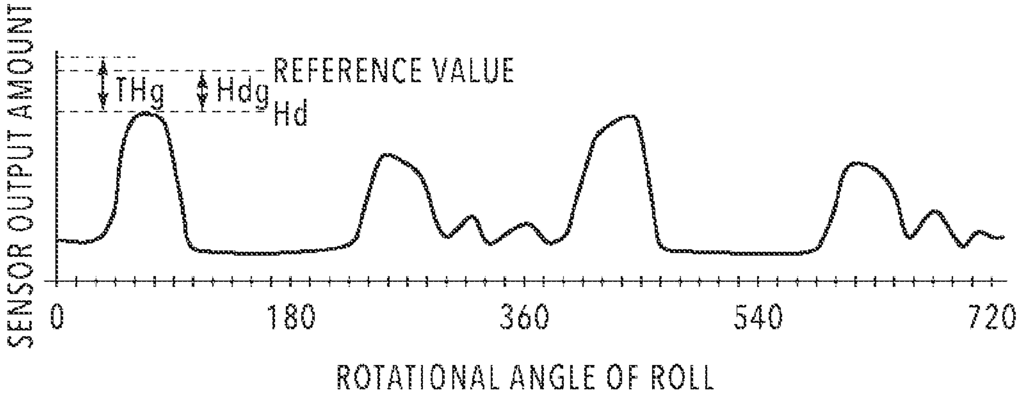
FIGS. 20A and 20B are explanatory diagrams of different examples of the sensor output of the sensor unit.
Figure 20B:
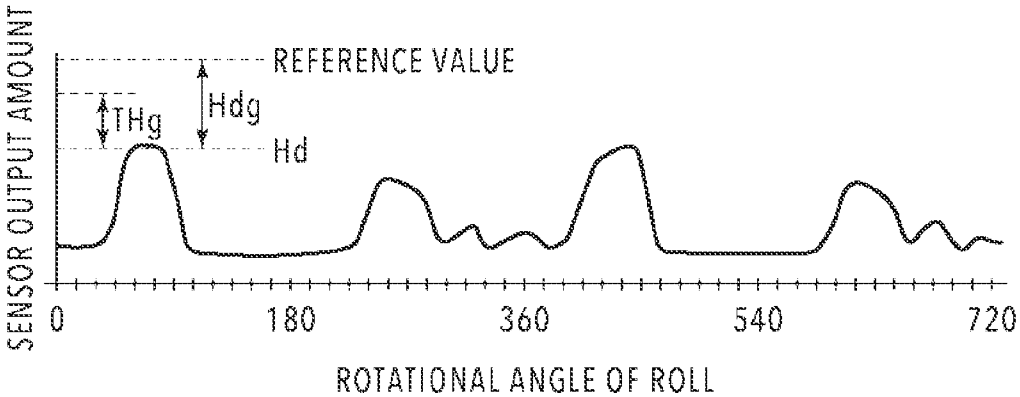

Thereafter, the CPU 201 determines whether or not a difference (Hd−Ld) between the highest value Hd and the lowest value Ld for all the sensor outputs of the sensor units 6 searched in steps S36 and S37 is equal to or larger than a predetermined threshold value THa (see FIGS. 18A, 18B, and 18C) (step S38). When all the sensor outputs of the searched sensor units 6 have an amplitude equal to or larger than the threshold value THa as in the cases of FIGS. 15A, 15B, 16B, and 17B, the process proceeds to step S39. In step S39, for the sensor outputs of all the sensor units 6 having an amplitude equal to or larger than the threshold value THa, the CPU 201 sets a difference Hdg of the highest value Hd and the highest value (reference value) of the sensor output of the reference side sensor unit 6(1) as illustrated in FIGS. 20A and 20B. The reference value is not limited only to the highest value of the sensor output of the reference side sensor unit 6(1) and may be any one of the highest values of the sensor outputs in the plurality of sensor units 6 whose sensor output has an amplitude equal to or larger than the threshold value THa. In the case of FIG. 17B, the sensor unit whose sensor output has an amplitude equal to or larger than the threshold value THa is only the sensor unit 6(1), and in this case, the difference Hdg is set on the basis of a reference value THw which is set in advance.

Thereafter, the CPU 201 determines whether or not the difference Hdg is less than a predetermined threshold value THg (see FIGS. 20A and 20B) for all the sensor units 6 whose sensor output has an amplitude equal to or larger than the threshold value THa (step S40). In a case where YES is determined in step S38 (the difference Hdg s less than the threshold value THg), the CPU 201 determines that the roll R is correctly set as illustrated in FIGS. 15A and 15B, and shifts to the sheet leading end setting process (step S3) of FIG. 5, similarly to the above-described first embodiment. Further, in a case where NO is determined in previous steps S38 and S40, the CPU 201 determines that the roll R is not correctly set and shifts the error process (step S41). In the error process, a notification indicating that the setting state of the roll R is abnormal is given to the user.

Thus, in the present embodiment, it is possible to determine whether or not the setting state of the roll R is abnormal on the basis of the sensor outputs of the plurality of sensor units 6 when the roll R is caused to perform the reverse rotation in the direction of arrow C2. When the setting state of the roll R is abnormal, the sheet leading end setting process (automatic loading) is not performed, and thus it is possible to prevent the sheet 1 from being folded and scratched due to the occurrence of jam. Further, since the notification indicating that the setting state of the roll R is abnormal is given to the user, it is possible to urge the user to execute the normal setting of the roll R and reduce the stop time of the sheet supplying apparatus.

Further, the threshold values THa, THr, and THg and the reference value THw may be stored in the main body of the printing apparatus or a non-volatile memory in the sensor unit 6 in advance. Further, these values may be fixed values, may be set for each type of roll R, or may be changed in accordance with an ambient temperature and an ambient humidity. In general, the sheet 1 is likely to swell in a high humidity environment, and the stiffness of the sheet 1 is likely to be strong in a low temperature and low humidity environment. Further, the number of installed sensor units 6 is not limited to four.

Modified Example

Figure 21:
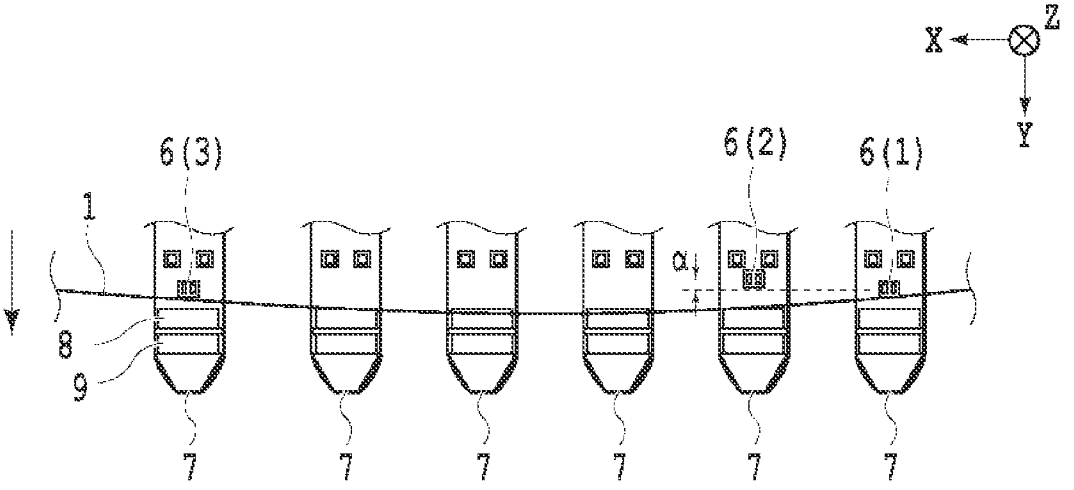
FIG. 21 is an explanatory diagram of another installation form of the sensor unit.

For example, the installation form of a plurality of sensor units is not limited to a form in which they are installed on an axial line parallel to the rotational shaft of the roll R, and for example, as illustrated in FIG. 21, the sensor units 6(1), 6(2), and 6(3) may be arranged in the Y axis direction in a zigzag manner. In this case, a maximum deviation amount $\alpha$ of the sensor unit in the Y axis direction is stored in the main body of the printer or the non-volatile memory of the sensor unit, and the detection timing of the leading end portion of the sheet 1 is corrected on the basis of the sensor output in accordance with the deviation amount $\alpha$. Accordingly, a similar detection result can be obtained in both of the case where the sensor units are installed in parallel to the rotational shaft of the roll R and in the case where the sensor units are installed in a zigzag manner. In a case where the deviation amount $\alpha$ falls within the range of the rotational angle $\theta$1 in FIG. 3 described above, a deviation width between sensor output timings of a plurality of sheet sensors corresponding to the deviation amount $\alpha$ falls within a rotation period of time corresponding to the rotational angle $\theta$1. Therefore, in a case where the deviation width between the timings falls within the rotation period of time corresponding to the rotational angle $\theta$1, it possible to determine that the automatic loading can be performed as described above.

The sensor unit 6 is not limited to an optical sensor, and a distance sensor other than an optical sensor can be used as the sensor unit 6 as long as it has an output value changing according to a distance to the sheet serving as the detection target. For example, a distance sensor such as an ultrasonic sensor or an electrostatic sensor that detects the distance to the object in a non-contact manner can be used.

The printing apparatus is not limited to the configuration including the two sheet supplying apparatuses corresponding to the two roll sheets and may be a configuration including one sheet supplying apparatus or three or more sheet supplying apparatuses. Further, the printing apparatus is not limited to the inkjet printing apparatus as long as an image can be printed on a sheet supplied from the sheet supplying apparatus.

Further, the present invention can be applied to various sheet supplying apparatuses in addition to the sheet supplying apparatus which supplies sheets serving as print medium to the printing apparatus. For example, the present invention can be applied to an apparatus that supplies a reading target sheet to a reading apparatus such as a scanner or a copying machine, an apparatus that supplies a sheet-like processing material to a processing apparatus such as a cutting apparatus, and the like. Such a sheet supplying apparatus may be configured separately from an apparatus such as the printing apparatus, the reading apparatus, or the processing apparatus, and may include a control unit (CPU) for the sheet supplying apparatus.

The sheet supplying apparatus is not limited to the configuration in which the driven rotating bodies 8 and 9 connected to the arm member 4 are brought into pressure contact with the roll R from the lower side of the roll R, and the position of the leading end portion of the roll R is detected using the sensor unit 6 installed in the arm member 4 as described above. For example, the driven rotating bodies 8 and 9 and the sensor unit 6 may be arranged on a fixed structure installed on the lower side of the roll R, and the roll R may come into pressure contact with the driven rotating bodies 8 and 9 due to its own weight of the roll R when the winding diameter of the roll R changes. Further, the roll R may be brought into pressure contact with the driven rotating bodies 8 and 9 using a driving mechanism.

The present invention can be widely applied as a supplying apparatus that supplies various sheets including paper, a film, cloth, and the like, a printing apparatus including the supplying apparatus, and various sheet processing apparatuses such as an image scanning apparatus. The image scanning apparatus scans an image of a sheet supplied from the supplying apparatus through a scanning head. Further, the sheet processing apparatus is not limited to only the printing apparatus and the image scanning apparatus as long as various processes (processing, coating, irradiation, inspection, and the like) can be performed on the sheet supplied from the supplying apparatus. In a case where the sheet supplying apparatus is configured as an independent apparatus, the apparatus can be equipped with a control unit including a CPU. In a case where the sheet supplying apparatus is installed in the sheet processing apparatus, at least one of the supplying apparatus and the sheet processing apparatus can be equipped with a control unit including a CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046433, filed Mar. 10, 2017, which is hereby incorporated by reference herein in its entirety.

What is claimed is:

1. A printing apparatus comprising:

a first sheet supplying unit which includes a first driving unit configured to rotate a first roll sheet, on which a sheet is wound, in a first direction for supplying the sheet and in a second direction opposite to the first direction, and a detection unit configured to detect the sheet supplied from the first roll sheet;

a second sheet supplying unit which includes a second driving unit configured to rotate a second roll sheet, on which a sheet is wound, in the first direction and in the second direction; and a print unit configured to print on a sheet supplied from the first sheet supplying unit or the second sheet supplying unit, wherein, in a case in which the detection unit cannot detect a leading end of a sheet after the first driving unit rotates the first roll sheet in the second direction more than a predetermined number of times, the first driving unit stops a rotation of the first roll sheet.

2. The printing apparatus according to claim 1, wherein in a case in which the detection unit detects the leading end of the sheet while the first roll sheet is rotating in the second direction, the first driving unit switches a rotation direction of the first roll sheet from the second direction to the first direction.

3. The printing apparatus according to claim 2, wherein the first sheet supplying unit includes a holding unit that holds the first roll sheet, and wherein the first driving unit starts rotating the first roll sheet in the second direction after the first roll sheet is held by the holding unit.

4. The printing apparatus according to claim 1, wherein the first sheet supplying unit includes a rotation amount sensor that acquires a rotation amount of the first roll sheet.

5. The printing apparatus according to claim 4, wherein the leading end of the sheet is determined based on an output from the detection unit and the rotation amount acquired by the rotation amount sensor.

6. The printing apparatus according to claim 4, wherein detection of the leading end of the sheet is determined based on an output of the detection unit during a rotation of a predetermined rotation amount of the first roll sheet.

7. The printing apparatus according to claim 1, wherein an output of the detection unit is changed according to a distance to the sheet.

8. The printing apparatus according to claim 7, wherein detection of the leading end of the sheet is determined based on the output during a predetermined period after a predetermined change of the output of the detection unit.

9. The printing apparatus according to claim 1, wherein the first sheet supplying unit includes a guide that moves in accordance with an outer diameter of the first roll sheet and supports the sheet supplied from the first roll sheet from a lower side.

10. The printing apparatus according to claim 9, wherein the detection unit is provided in the guide.

11. The printing apparatus according to claim 9, wherein the detection unit is arranged at a position where the leading end of the sheet separated from the first roll sheet approaches.

12. The printing apparatus according to claim 1, further comprising a notifying unit configured to give notification indicating that a sheet is not detected.

13. A printing method comprising:

first supplying in which a first driving unit rotates a first roll sheet, on which a sheet is wound, in a first direction for supplying the sheet and in a second direction opposite to the first direction, and a detection unit detects the sheet supplied from the first roll sheet;

second supplying in which a second driving unit rotates a second roll sheet, on which a sheet is wound, in the first direction and in the second direction; and printing on a sheet supplied in the first supplying or the second supplying, wherein, in a case in which the detection unit cannot detect a leading end of a sheet after the first driving unit rotates the first roll sheet in the second direction more than a predetermined number of times, a rotation of the first roll sheet is stopped.

14. The printing method according to claim 13, wherein in a case in which the leading end of the sheet is detected by the detection unit while the first roll sheet is rotating in the second direction, the first driving unit switches a rotation direction of the first roll sheet from the second direction to the first direction.

15. The printing method according to claim 14, wherein in the first supplying, a holding unit holds the first roll sheet, and wherein the first roll sheet starts rotating in the second direction after the first roll sheet is held by the holding unit.

16. The printing method according to claim 13, wherein in the first supplying, a rotation amount sensor acquires a rotation amount of the first roll sheet.

17. The printing method according to claim 16, wherein the leading end of the sheet is determined based on an output from the detection unit and the rotation amount acquired by the rotation amount sensor.

18. The printing method according to claim 16, wherein detection of the leading end of the sheet is determined based on an output of the detection unit during a rotation of a predetermined rotation amount of the first roll sheet.

* * * * *